United States Patent
Ueno et al.

(10) Patent No.: US 6,516,772 B2
(45) Date of Patent: Feb. 11, 2003

(54) COMBUSTION STATE CONTROL SYSTEM OF INTERNAL COMBUSTION ENGINE

(75) Inventors: Masaki Ueno, Wako (JP); Yasunori Ehara, Wako (JP); Masahiro Sato, Wako (JP); Ken Ogawa, Wako (JP); Isao Komoriya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 14 days.

(21) Appl. No.: 09/904,851

(22) Filed: Jul. 16, 2001

(65) Prior Publication Data

US 2002/0026921 A1 Mar. 7, 2002

(30) Foreign Application Priority Data

Jul. 17, 2000 (JP) ......................................... 2000-216014

(51) Int. Cl.[7] ........................... F02B 75/08; F02M 37/04
(52) U.S. Cl. .................. 123/295; 123/406.26; 123/698; 123/520
(58) Field of Search ................................ 123/698, 295, 123/406.26, 674, 305; 60/274, 276, 285, 286

(56) References Cited

U.S. PATENT DOCUMENTS

| 5,548,514 A | 8/1996 | Hasegawa et al. |
| 5,600,056 A | 2/1997 | Hasegawa et al. |
| 6,176,227 B1 * | 1/2001 | Ohuchi et al. ............... 123/698 |
| 6,332,456 B2 * | 12/2001 | Mashiki ....................... 123/520 |
| 6,374,597 B1 * | 4/2002 | Bidner et al. .................. 60/285 |
| 6,438,944 B1 * | 8/2002 | Bidner et al. .................. 60/274 |

FOREIGN PATENT DOCUMENTS

JP 9-268942 10/1997

* cited by examiner

Primary Examiner—Carl S. Miller
(74) Attorney, Agent, or Firm—Arent Fox Kintner Plotkin & Kahn, PLLC

(57) ABSTRACT

In a direct injection spark ignition engine which is operable in lean-burn operation modes including a pre-mixture combustion mode and a stratified combustion operation mode and a stoichiometric air/fuel ratio operation mode, which are different in the desired air/fuel ratio. The degradation of combustion state is detected through misfire detection and if it is determined to be degraded, the desired air/fuel ratio, the EGR flow rate and the ignition timing are changed when the engine is operated in the stratified combustion operation mode, while the desired air/fuel ratio, the EGR flow rate and the purge flow rate are changed when the engine is operated in the pre-mixture combustion operation mode, thereby ensuring to suppress the combustion state degradation effectively.

16 Claims, 16 Drawing Sheets

COMBUSTION STATE CONTROL SYSTEM OF INTERNAL COMBUSTION ENGINE

BACKGROUND OF THE INVENTION

1. Field of the Invention

This invention relates to a combustion state control system of an internal combustion engine, more particularly to a system for controlling combustion state of a direct injection spark ignition multi-cylinder engine, in which gasoline fuel is directly injected into the combustion chamber of the engine.

2. Description of the Related Art

Japanese Laid-Open Patent Application No. Hei 9 (1997)-268942 teaches, when the combustion state degrades or deteriorates in a direct injection spark ignition engine operable in a stratified combustion operation mode (a kind of lean burn operation mode), suppressing the combustion state degradation by changing gradually at least one of the Exhaust Gas Recirculation flow rate (or amount), the ignition timing and the air/fuel ratio.

Specifically, it teaches suppressing the combustion state degradation, at first, through the ignition timing or the air/fuel ratio, and if the combustion state remains unchanged, then decreasing the EGR flow rate. If the combustion still remains at the degraded state, it teaches changing the fuel injection timing from the compression stroke to the intake stroke, and if the situation nevertheless remains unchanged, enriching the air/fuel ratio up to the stoichiometric air/fuel ratio.

Thus, this prior art discloses changing various engine operation parameters when the combustion state is found to be degraded. However, this prior art discusses the problem under this stratified combustion operation mode only as an example of the lean burn operation mode.

However, some engines are operable in a plurality of lean-burn operation modes, e.g. two modes comprising this stratified combustion operation mode (diffusion combustion operation mode) in which the desired air/fuel ratio KCMD is determined to be, at maximum 60.0:1 and fuel is injected at the compression stroke, and a pre-mixture combustion operation mode (uniform combustion operation mode) in which the desired air/fuel ratio KCMD is determined to be richer (less lean) than that of the stratified operation mode and fuel is injected at the intake stroke.

In an engine having these two kinds of lean-burn operation modes, the parameters contributing to the combustion stability are not always common for the two modes. Specifically, the air/fuel ratio, the EGR flow rate and the purge flow rate (of vaporized fuel to the air intake system) play a significant role in stabilizing the combustion state in the stratified combustion operation mode, while the air/fuel ratio, the EGR flow rate and the ignition timing exhibits excellent contribution to stabilize the combustion state in the pre-mixture combustion operation mode.

Accordingly, it is preferable to select the parameters most effective in restoring the combustion state stability, if it degrades, in response to the selected operation mode and to suppress the combustion state degradation by changing the selected parameters. However, the aforesaid prior art teaches or suggests nothing on this.

SUMMARY OF THE INVENTION

An object of the present invention is therefore to provide a combustion state control system of an internal combustion engine operable in a selected one of a plurality of lean-burn operation modes, which selects the parameters most effective in restoring the combustion state stability, if it degrades, in response to the selected operation mode and suppresses the combustion state degradation by changing the selected parameters.

This invention achieves this object by providing a system for controlling combustion state of an internal combustion engine in which gasoline fuel is directly injected into cylinder combustion chambers, including: an air/fuel ratio sensor for detecting an air/fuel ratio of exhaust gas exhausted from the engine; engine operating condition detecting module which detects operating conditions of the engine including at least an engine speed and an engine load; fuel injection amount calculating module which calculates a basic fuel injection amount based on at least the engine speed and the engine load of the detected engine operating conditions and corrects the basic fuel injection amount, such that an error between the detected air/fuel ratio and a desired air/fuel ratio decreases, to determine an output fuel injection amount to be injected into the cylinder combustion chambers of the engine; ignition timing calculating module which calculates an ignition timing based on at least the engine speed and the engine load of the detected engine operating conditions to ignite a mixture of the injected fuel and air drawn through an air intake system and flowing into the cylinder combustion chambers; EGR flow rate regulating module which regulates an EGR flow rate of the exhaust gas recirculated through a pipe connecting an exhaust system and an air intake system of the engine; and combustion state control module which conducts a control to suppress degradation of combustion state, if it is determined to be degraded, by changing at least one of the desired air/fuel ratio, the EGR flow rate and the ignition timing when the engine is operated in a lean-burn operation mode of a stratified combustion operation mode in which the desired air/fuel ratio is set to be a lean value. The characteristic features are that the system includes; purge flow rate regulating module which regulates a purge flow rate of vaporized fuel to be purged through a pipe connecting a canister and the air intake system of the engine; and operation mode selecting module which selects one of the lean-burn operation modes comprising the stratified combustion operation mode and a pre-mixture combustion operation mode in which the desired air/fuel ratio is set to be a value less lean than that of the stratified combustion mode; and the combustion state control module conducts the control to suppress the degradation of combustion state, if it is determined to degraded, by changing the desired air/fuel ratio, the EGR flow rate and the ignition timing when the engine is operated in the stratified combustion operation mode, while by changing the desired air/fuel ratio, the EGR flow rate and the purge flow rate when the engine is operated in the pre-mixture combustion operation mode.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

Embodiments of the present invention will now be explained with reference to the drawings.

Figure 1:
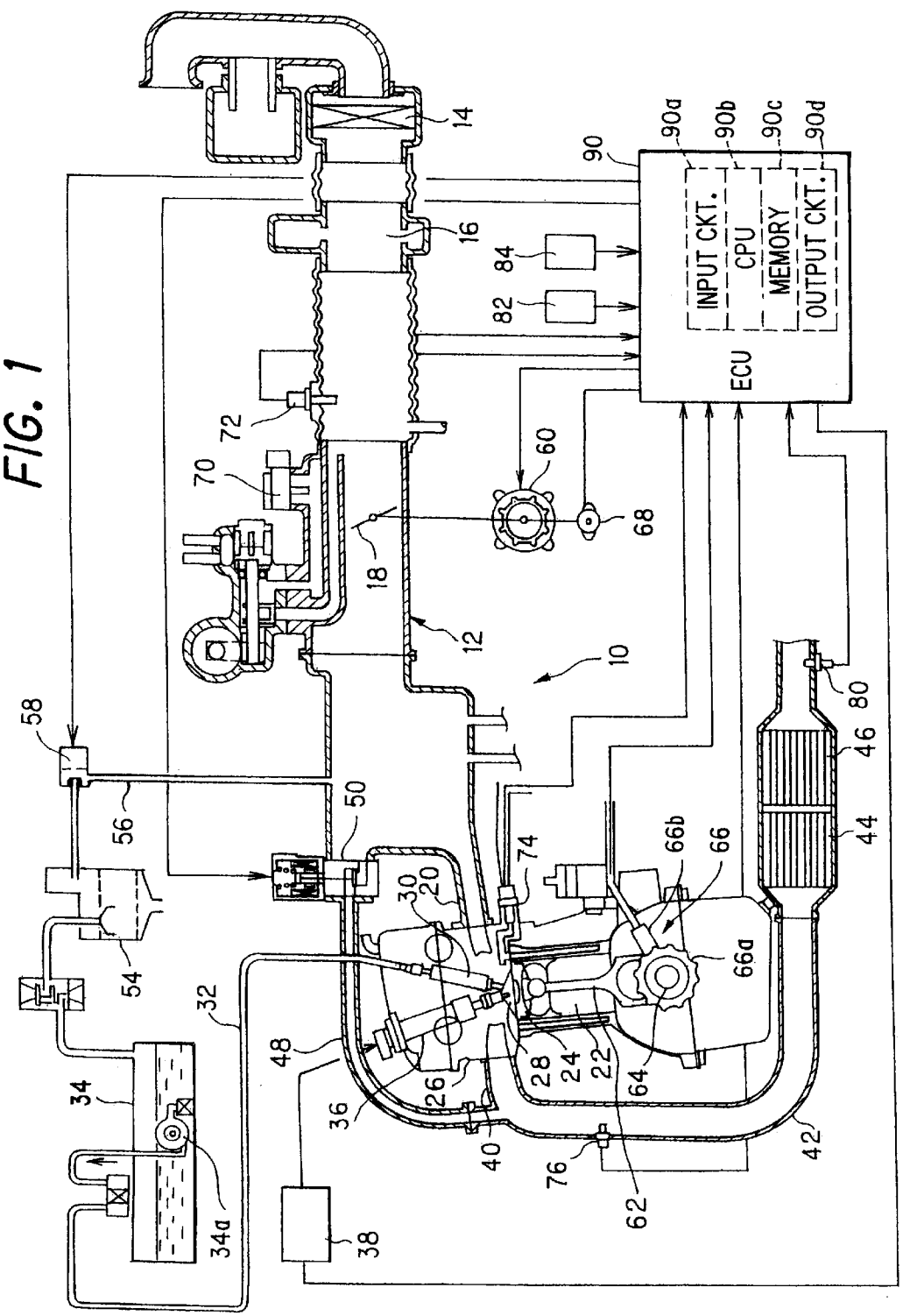
FIG. 1 is an overall schematic view showing a combustion state control system of an internal combustion engine according to an embodiment of the invention.

FIG. 1 is an overall schematic view of a combustion state control system of an internal combustion engine according to an embodiment of the invention.

Reference numeral 10 in this figure designates an OHC in-line four-cylinder internal combustion engine. Air drawn into an air intake pipe 12 through an air cleaner 14 mounted on its far end flows through a surge tank 16 and an intake manifold 20, while the flow thereof is adjusted by a throttle valve 18, to two intake valves (neither shown) of respective one of the first (#1) to fourth (#4) cylinders 22 (for brevity of illustration, only one is shown in the figure).

Each cylinder 22 has a piston 24 which is displaceable in the cylinder 22. The top of the piston 24 is recessed such that a combustion chamber 28 is formed in a space defined by the recessed piston top and the inner wall of a cylinder head. A fuel injector 30 is provided in the vicinity of the center of the ceiling of the combustion chamber 28.

The fuel injector 30 is connected, via a fuel supply pipe 32, to a fuel tank 34 and is supplied with pressurized fuel (gasoline) which is pumped by a pump 34a and is pressurized to a predetermined level by a high-pressure pump and a regulator (neither shown). The fuel injector 30 injects fuel directly into the combustion chamber 28 when opened. The injected fuel mixes with the air and forms the air-fuel mixture.

A spark plug 36 is provided in the combustion chamber 28. The spark plug 36 is supplied with electric energy from an ignition system 38 including an ignition coil (not shown) and ignites the air-fuel mixture at a predetermined ignition timing in the order of the first, the third, the fourth and the second cylinder. The resulting combustion of the air-fuel mixture drives down the piston 24.

Thus, the engine 10 is a direct injection spark ignition multi-cylinder engine in which the gasoline fuel is directly injected into the combustion chamber 28 of respective cylinders 22 through the fuel injector 30.

The exhaust gas produced by the combustion is discharged through two exhaust valves (neither shown) into an exhaust manifold 40, from where it passes through an exhaust pipe 42 to a catalytic converter 44 (for removing NOx in the exhaust gas) and a second catalytic converter 46 (three-way catalyst for removing NOx, CO and HC in the exhaust gas) to be purified and then flows out of the engine 10.

The exhaust pipe 42 is connected, at a location downstream of the confluence point of the exhaust manifold 40, to the air intake pipe 12 by an EGR conduit 48, at a position downstream of the throttle valve, so as to recirculate the exhaust gas partially in the operation of EGR (Exhaust Gas Recirculation). An EGR control valve 50 is provided at the EGR conduit 48 and is opened to recirculate a part of the exhaust gas at predetermined engine operating conditions, while regulating the flow rate of exhaust gas recirculation (EGR amount).

A canister 54 is installed and is connected to a space above the fuel level of the fuel tank 34 such that vaporized fuel is supplied to the canister 54 and is trapped in the activated charcoal filled in the canister 54. The canister 54 is connected through a purge pipe 56 to the air intake pipe 12, at a location downstream of the throttle valve 18. A canister control valve 58 is provided at the purge pipe 56 and is opened to purge a part of the vaporized fuel at predetermined engine operating conditions, while regulating the flow rate of purge (purge flow rate).

The throttle valve 18 is not mechanically linked with an accelerator pedal (not shown) installed at the floor of a vehicle operator seat (not shown), but is connected to a stepper motor 60 to be driven by the motor to open/close the air intake pipe 12. The throttle valve 18 is operated in such a DBW (Drive-By-Wire) fashion.

The piston 24 is connected to a crankshaft 64 through a connecting rod 62 to rotate the same. A crank angle sensor 66 is installed in the vicinity of the crankshaft 64, which comprises a pulser 66a fixed to the rotating crankshaft 64 and an electromagnetic pickup 66b fixed in an opposing stationery position. The crank angle sensor 66 generates a cylinder discrimination signal (named "CYL") once every 720 crank angular degrees, a signal (named "TDC" (Top Dead Center)) at a predetermined BTDC crank angular position and a unit signal (named "CRK") at 30 crank angular degrees (named "STAGE") obtained by dividing the TDC signal intervals by six.

A throttle position sensor 68 is connected to the stepper motor 60 and generates a signal indicative of the opening degree of the throttle valve 18 (named "TH"). A manifold absolute pressure (MAP) sensor 70 is provided in the air intake pipe 12 downstream of the throttle valve 18 and generates a signal indicative of the engine load, more precisely the absolute manifold pressure (named "PBA") generated by the intake air flow there through a conduit (not shown).

An intake air temperature sensor 72 is provided at a location upstream of the throttle valve 18 and generates a signal indicative of the temperature of intake air (named "TA"). And a coolant temperature sensor 74 is installed in the vicinity of the cylinder 22 and generates a signal indicative of the temperature of an engine coolant (named "TW").

Further, a universal (or wide range) sensor (air/fuel ratio sensor) 76 is installed at the exhaust pipe 42 at a position upstream of the catalytic converters 44, 46 and generates a signal indicative of the exhaust air/fuel ratio that changes linearly in proportion to the oxygen concentration in the exhaust gas. This sensor 76 is hereinafter referred to as "LAF" sensor.

Figure 2:
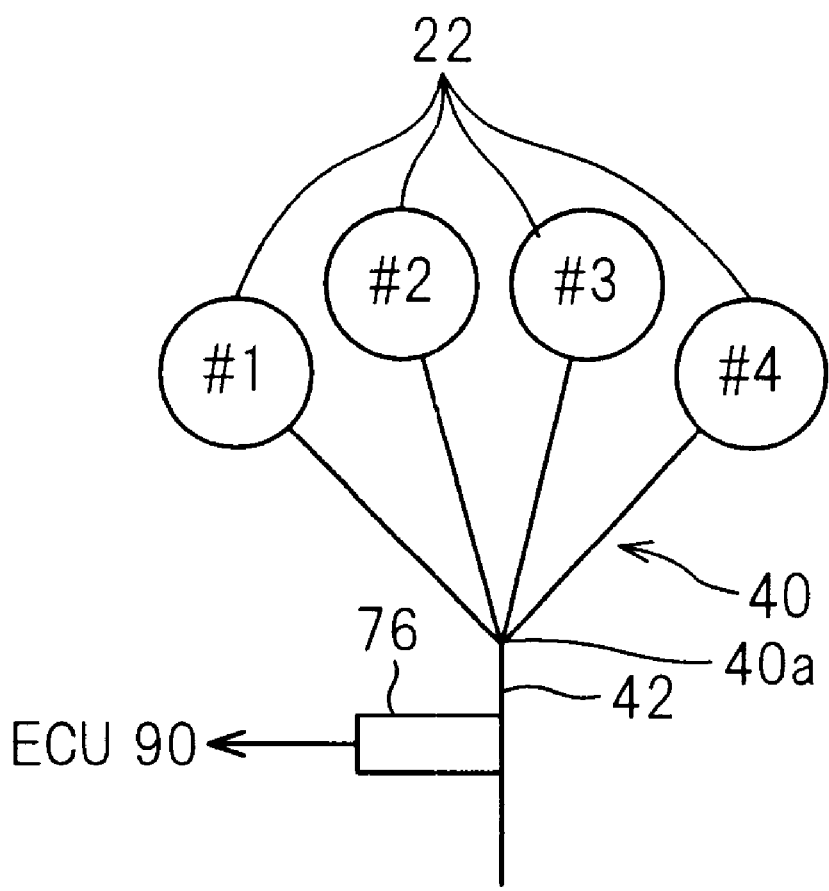
FIG. 2 is a schematic view showing where an air/fuel ratio sensor (LAF sensor) is installed relative to the exhaust manifold of the engine illustrated in FIG. 1.

As schematically illustrated in FIG. 2, only one LAF sensor 76 is installed at a position downstream of a confluence point 40a of the exhaust manifold 40 and generates the signal indicative of the air/fuel ratio in the gases exhausted from the cylinders 22 of the engine 10.

In addition, an $O_2$ sensor (air/fuel ratio sensor) 80 is provided at a position czar downstream of the catalytic converters 44, 46 and generates a signal which changes each time the exhaust air/fuel turns from lean to rich and vice versa with respect to a stoichiometric air/fuel ratio.

Furthermore, an accelerator position sensor 82 is provided in the vicinity of the accelerator pedal which generates a signal indicative of the position (opening degree) of the accelerator pedal (named "θAP"). And an atmospheric pressure sensor 84 is installed at an appropriate location of the engine 10 and generates a signal indicative of the atmospheric pressure (named "PA") of the place where a vehicle on which the engine 10 is mounted runs.

The outputs of the sensors are sent to an ECU (Electronic Control Unit) 90. The ECU 90 comprises a microcomputer having an input circuit 90a, a CPU 90b, a memory (ROM, RAM, etc.) 90c, an output circuit 90d and a counter (not shown). The CRK signal generated by the crank angle sensor 66 is counted by the counter and the engine speed NE is detected or calculated.

The outputs of the LAF sensor 76 is successively sampled (i.e. A/D converted) at every STAGE and is stored in the memory 90c. The STAGE is 30 crank angle degrees as mentioned above and the STAGEs in TDC intervals are assigned with a number (named "STAGE No.") and are identified with each other.

The ECU 90 determines or calculates the fuel injection amount and the ignition timing based on the detected engine speed NE and the inputted sensor outputs.

Explaining the fuel determination, at first, the ECU 90 determines or calculates a desired engine torque PME indicative of the engine load (or the output required by the vehicle operator) based on the detected engine speed NE and the accelerator pedal position θAP. Then, the ECU 90 selects or determines one of the aforesaid operation modes of the engine 10 based on the determined desired engine torque PME and the detected engine speed NE. The ECU 90 further determines or calculates the desired air/fuel ratio KCMD based on the determined desired engine torque PME and the detected engine speed NE.

Specifically, when the determined desired engine torque PME falls in the region of high engine load, the ECU 90 determines the operation mode (hereinafter referred to as "ST.EMOD") as the stoichiometric air/fuel ratio operation mode ("ST.EMOD=0") in which the desired air/fuel ratio KCMD is determined to be the stoichiometric air/fuel ratio or thereabout, more specifically in a range from 12.0:1 to 15.0:1.

When the determined desired engine torque PME falls in the region of medium engine load, the ECU 90 determines the operation mode ST.EMOD as the pre-mixture combustion operation mode ("ST.EMOD=1") in which the desired air/fuel ratio KCMD is determined to be an air/fuel ratio leaner than the stoichiometric air/fuel ratio, more specifically in a range from 15.0:1 to 22.0:1.

And, when the determined desired engine torque PME falls in the region of low engine load, the ECU 90 determines the operation mode ST.EMOD as the stratified combustion operation mode ("ST.EMOD=2") in which the desired air/fuel ratio KCMD is determined to be an air/fuel ratio leaner than that in the pre-mixture combustion operation mode, more specifically in a range from 22.0:1 to 60.0:1. Thus, the engine 10 is configured to have two kinds of a lean-burn combustion operation modes comprising the pre-mixture combustion operation mode and the stratified combustion operation mode.

When the stoichiometric combustion operation mode or the pre-mixture combustion operation is selected, the fuel is injected during the intake stroke. The injected fuel mixes with the intake air and is ignited to produce the pre-mixture charged combustion (uniform combustion). When the stratified combustion operation mode is selected, the fuel is injected during the compression stroke (and sometimes partially injected at the intake stroke) and produces the stratified charged combustion (more precisely, the Direct Injecting Stratified Charged combustion or diffusion combustion).

It should be noted that the operation mode (indicative of the engine load) is determined based on the detected engine speed NE and the calculated desired engine torque PME, but the fuel injection should be always effected such that the actual air/fuel ratio in the vicinity of the spark plug 36 falls within a range from 12.0:1 to 15.0:1, whichever operation mode is selected.

Then, the ECU 90 determines or calculates an output fuel injection amount TOUT as follows:

$$TOUT = (TCYL - B \times TWP)/A$$

In the above, TWP is a parameter indicative of the amount of fuel injected, but adhered to the inner wall of the intake pipe 12 and is calculated as follows:

$$TWP = (1-A) \times TOUT + (1-B) \times TWP$$

In the above, A is a direct ratio of the parameter indicative of the amount fuel adhered to the intake pipe wall, and B is a take-off ratio of the parameter. TCYL is the fuel injection amount in the cylinder concerned required by the engine 10 and is calculated as follows:

$$TCYL = TIM \times KCMDM \times KAF \times KT + TT$$

In the above, TIM indicates a basic fuel injection amount expressed in terms of an opening period of the fuel injector 30 and is obtained by retrieving predetermined mapped data using the detected engine speed NE and the manifold absolute pressure PBA as address data. KAF indicates an air/fuel ratio feedback correction coefficient based on the output of the LAF sensor 76. KT is the product of the other correction coefficients in multiplication form and TT is the sum of the other correction factors in additive form. And KCMDM indicates a desired air/fuel ratio correction coefficient and is obtained by correcting the aforesaid desired air/fuel ratio KCMD by the charging efficiency.

Specifically, KCMDM is calculated as follows:

$$KCMD=KBS \times KWOT \times KLEAN \times KMF$$

In the above, KBS is a basic value obtained by separately retrieving predetermined mapped data, in response to the selected operation mode, using the detected engine speed NE and the manifold absolute pressure PBA (or the desired engine torque PME) as address data. KWOT is an enrichment correction coefficient when the throttle valve 18 is fully (wide) opened. KLEAN is a lean correction coefficient at engine starting for decreasing HC. KMF is a driveability compensating air/fuel ratio correction coefficient and initially set to be 1.0 and to increase with increasing degradation of combustion state as will be explained later.

It should be noted that, although other coefficients are used in calculating the desired air/fuel ratio KCMD, since the gist of the invention does not reside in the calculation itself, no further explanation will be made. It should also be noted that the desired air/fuel ratio KCMD and the desired air/fuel ratio correction coefficient KCMDM are, in fact, expressed in the equivalence ratio.

Explaining the ignition timing determination, the ECU 90 determines or calculates a basic ignition timing IGMAP based on the detected engine speed NE and the calculated desired engine torque PME in the stratified combustion operation mode, and determines or calculates the same based on the detected engine speed NE and the manifold absolute pressure PBA in the pre-mixture combustion operation mode and the stoichiometric air/fuel ratio operation mode.

Then, the ECU 90 determines or calculates an output ignition timing IG as follows:

$$IG=IGMAP+IGCR$$

In the above, IGCR indicates the sum of correction factors and is calculated as follows:

$$IGCR=IGTW+IGTA+IGADV+IGMF$$

In the above, IGTW is an ignition timing correction coefficient for the engine coolant temperature TW. IGTA is a similar correction coefficient for the atmospheric temperature TA, and IGADV is a similar correction coefficient for the air/fuel ratio, more specifically that for advancing the ignition timing when the air/fuel ratio is set to be a lean value. IGMF is a driveability compensating ignition timing correction coefficient, similar to the aforesaid KMF, and is initially set to be 1.0 and to increase in the minus direction (in the direction in which the ignition timing is retarded) with increasing degradation of combustion state as will be explained later.

Then, the ECU 90 outputs a signal to the ignition system 38 and the spark plug 36 to ignite the air-fuel mixture at a crank angular position corresponding to the determined output ignition timing IG.

The operation of the combustion state control system of an internal combustion engine according to the embodiment will be explained.

Figure 3:
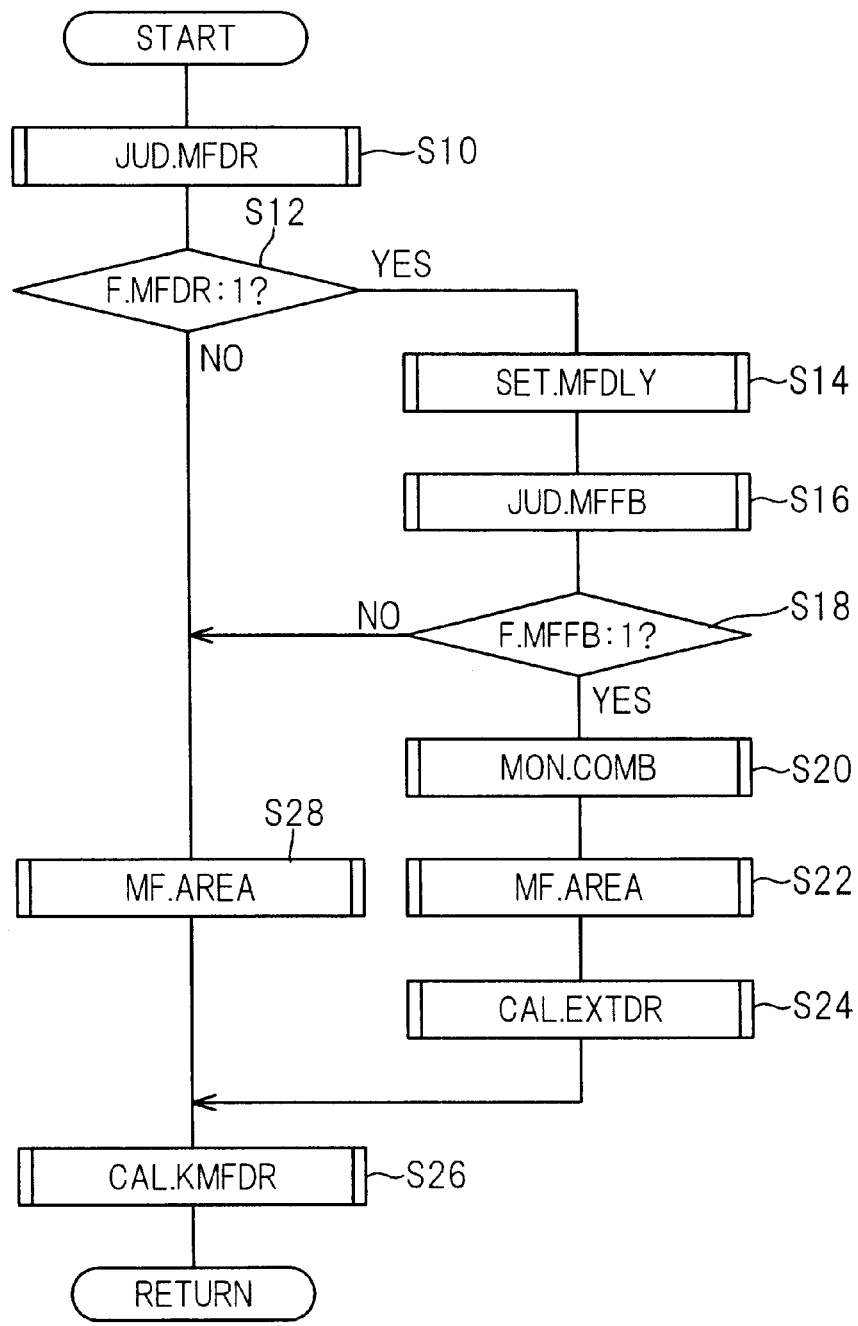
FIG. 3 is a flow chart showing the operation of the system illustrated in FIG. 1.

FIG. 3 is a flow chart showing the operation of the system. The program illustrated there is executed at a predetermined crank angular position near Top Dead Center of each cylinder 22 of the engine 10.

Explaining this, the program begins in S10 in which it is determined whether the control for suppressing the combustion state degradation should be implemented or executed. The word JUD.MFDR indicates this. It should be noted that in this embodiment, the control is referred to the driveability compensation control.

Figure 4:
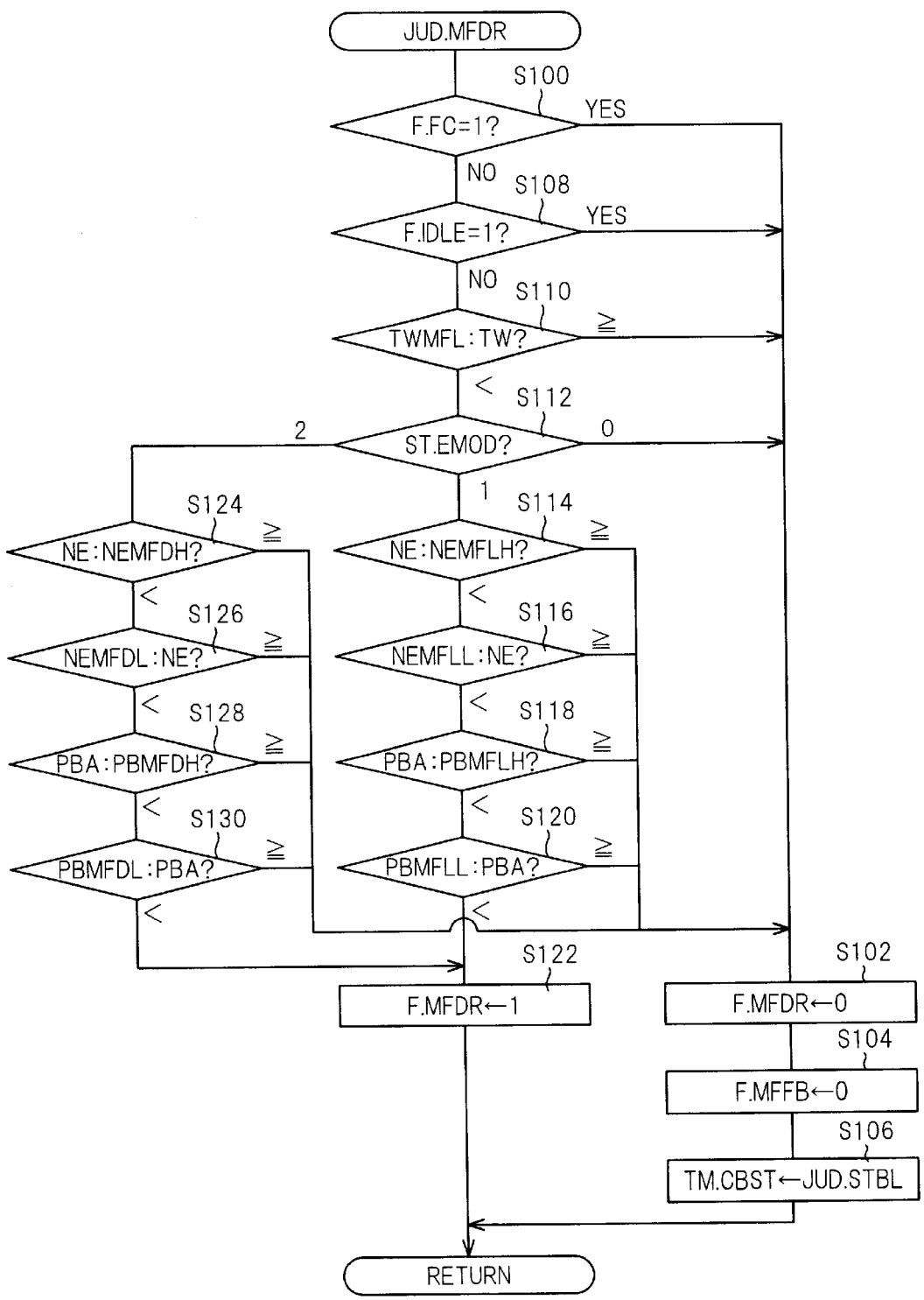
FIG. 4 is a flow chart showing the subroutine of determination whether the control for suppressing the combustion stability degradation (driveability compensation control) should be executed, referred to in the flow chart of FIG. 3.

FIG. 4 is a flow chart showing the subroutine of this determination.

Figure 5:
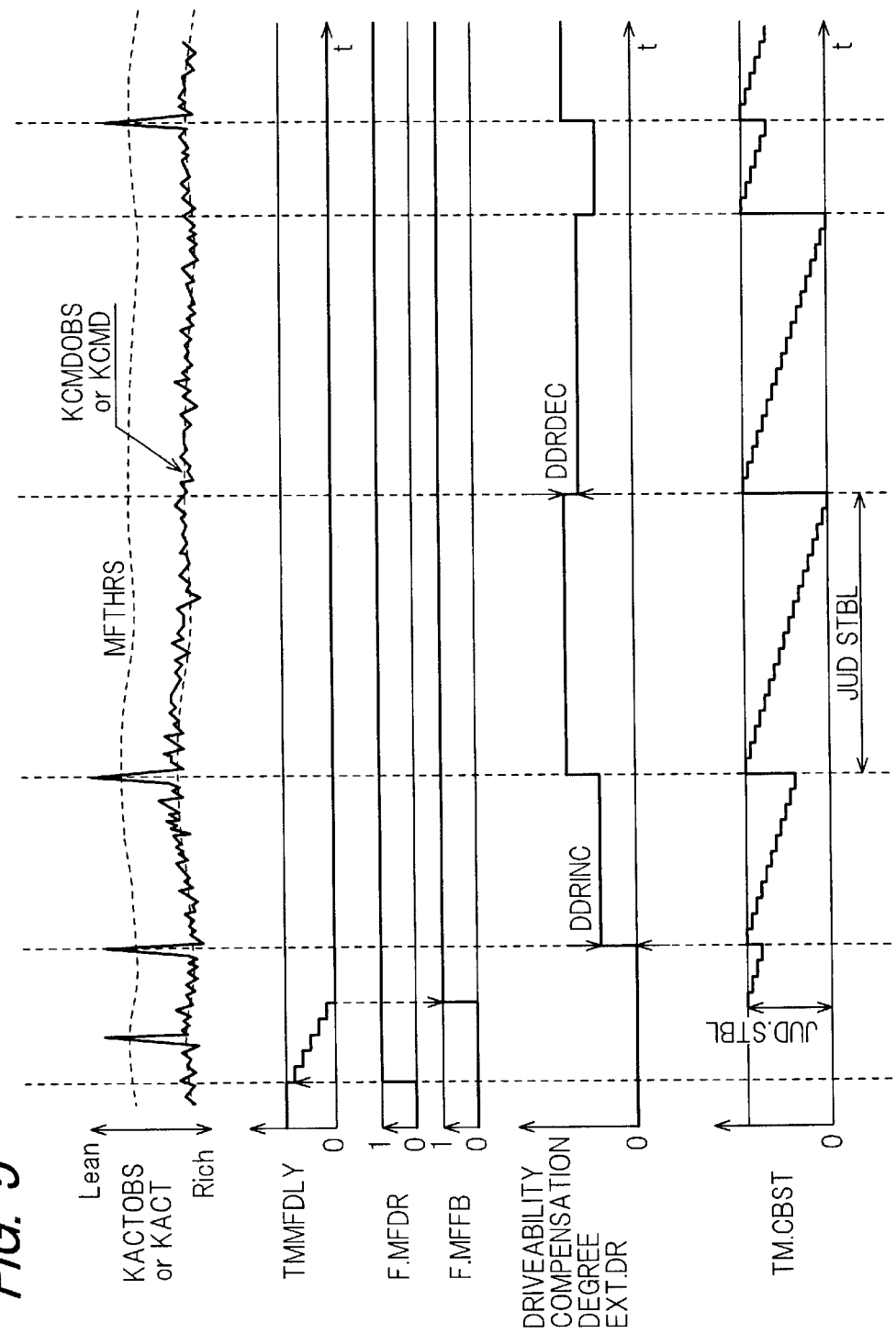
FIG. 5 is a time chart showing the operation (driveability compensation control) of the system illustrated in FIG. 3.

Before entering the explanation of the figure, however, the control according to the embodiment will be outlined with reference to a time chart shown in FIG. 5.

In this control, it is detected or determined at first whether or not misfire has occurred by comparing the detected (exhaust) air/fuel ratio KACTOBSV (or KACT) with a threshold value MFTHRS set at a lean side (in terms of the air/fuel ratio), as shown at the top of FIG. 5.

When the misfire has been detected, a combustion stability judging timer (down-counter) TM.CBST is set with a predetermined value JUD.STBL to start counting down (time measurement) and a parameter indicative of the degree of compensating for the driveability is incremented (increased) by a unit amount DDRINC. This parameter (hereinafter this parameter is called "driveability compensation degree EXT.DR") is expressed by the value of a counter (up-counter).

Then, using the driveability compensating degree EXT.DR as address data, weight coefficient tables are retrieved to calculate weight coefficients named WT.AF WT.EGR, WT.IG, WT.EVP. In corresponding thereto, correction coefficient maximum values named KMFLM, KEMFLM, KIGMFLM, KEVPMFLM are prepared beforehand and they are multiplied by the retrieved weight coefficients such that the desired air/fuel ratio, the desired EGR flow rate LCMD and the ignition timing IG (or the desired purge flow rate QPG) are corrected in such a way that the driveability is compensated for or improved.

The term "driveability" generally means "driving performance of vehicle" or "driving feeling of vehicle". Accordingly, the fact that misfire has occurred indicates that the combustion state has degraded and hence, the driveability has degraded. Therefore, in order to compensate for the driveability, more specifically, to suppress the degradation of combustion state, these parameters are corrected.

The above will be repeated until misfire has been suppressed. When the value (JUD.STBL) of the combustion stability judgement timer TM.CBST has reached zero without detecting misfire, it is determined that the combustion state has become stabilized and the driveability compensation degree EXT.DR is decremented (decreased) by a unit amount DDRDEC. However, if misfire has again detected, the counting of the combustion stability judgement timer TM.SBST and EXT.DR are resumed.

In the direct injection spark ignition engine 10, the error between the desired air/fuel ratio and the detected air/fuel ratio may sometimes become large, due to disturbance caused by such as manufacturing variance of the fuel injector 30, the variance in the EGR flow rate or the difference in fuel nature, which results in the driveability degradation.

As mentioned above, the engine 10 is configured to have two kinds of lean-burn combustion operation modes comprising the pre-mixture combustion operation mode (ST.EMOD=1) and the stratified combustion operation mode (ST.EMOD=2).

In such an engine 10 having these two kinds of lean-burn operation modes, the factors (parameters) having great influence on the driveability (i.e. contributing greatly to the combustion stability) are not always the same in the two modes. Specifically, the air/fuel ratio, the EGR flow rate and the ignition timing have great influence on the driveability in the pre-mixture combustion operation mode, while the air/fuel ratio, the EGR flow rate and the purge flow rate have great influence on the driveability in the stratified combustion operation mode.

Accordingly, in order to compensate for the driveability degradation, in other words, in order to suppress the combustion state degradation, it is most effective to select and correct the factors which are most effective in restoring the driveability, if it degrades, in the operation mode concerned. For example, since the stratified combustion is realized in the stratified combustion operation mode by delicately balancing parameters necessary for the combustion, the fuel injection timing or ignition timing is worthless for restoring the combustion state stability.

In view of the above, in this embodiment, the combustion state is determined or detected by detecting the occurrence of misfire and when the combustion state degradation has been detected, the factors or parameter having great influence for restoring stability are selected and changed in the operation mode concerned. The misfire detection is conducted by the detected air/fuel ratio with the threshold value as mentioned above and the detected air/fuel ratio in each cylinder is estimated accurately based on the single LAF sensor 76 with the use of model and observer describing the behavior of the exhaust system, thereby enabling to ensure an accurate misfire detection, i.e. an accurate combustion state degradation.

Based on the above, the processing in the flow chart of FIG. 4 will be explained.

The program begins in S100 in which it is determined whether the bit of a flag F.FC is set to be 1. Since the bit of the flag is set to 1 in a routine (not shown) when the fuel cutoff (fuel supply discontinued) is in progress, the determination amounts for determining whether the fuel cutoff is in progress.

When the result is affirmative, since this indicates the engine 10 is not under steady operating condition, the program proceeds to S102 in which the bit of a flag F.MFDR is reset to 0. To reset the bit of this flag 0 indicates that it is determined that the driveability compensation control should not be implemented.

The program then proceeds to S104 in which the bit of a flag F.MFFB is reset to 0. This flag indicates whether or not the feedback control of the driveability compensation should be implemented and to reset the bit of this flag to 0 indicates that the feedback control should not be implemented, while to set the bit of this flag to 1 indicates that the feedback control should be implemented.

The program then proceeds to S106 in which the aforesaid value JUD.STBL is set on the aforesaid combustion stability judgement timer TM.CBST to start count down.

On the other hand, when the result in S100 is negative, the program proceeds to S108 in which it is determined whether the bit of a flag F.IDLE is set to 1. Since the bit of the flag is set to 1 in a routine (not shown) when the engine 10 is idling, this determination amounts for determining whether the engine 10 is idling. When the result in S108 is affirmative, since the EGR or the canister purging may disturb the engine idling and hence the correction should be avoided, the program proceeds to S102 and on.

When the result in S108 is negative, the program proceeds to S110 in which the detected engine coolant temperature TW is compared with a predetermined value TWMFL (e.g. 70° C.). When the detected engine coolant temperature TW is less than or equal to the predetermined value TWMFL, since this indicates that the engine 10 is not under steady operating condition, the program proceeds to S102. On the other hand, when the detected engine coolant temperature TW is greater than the predetermined value TWMFL, the program proceeds to S112 in which it is determined which operation mode is selected.

When it is determined that the stoichiometric air/fuel ratio operation mode is selected, since the aforesaid combustion state control is not conducted in this operation mode, the program proceeds to S102.

When it is determined that the pre-mixture combustion operation mode is selected, the program proceeds to S114 in which the detected engine speed NE is compared with a predetermined value NEMFLH (e.g. 3000 rpm). When it is determined that the detected engine speed NE is greater than or equal to the predetermined value NEMFLH, the program proceeds to S102 for the same reason.

When it is determined in S114 that the detected engine speed NE is less than the predetermined value NEMFLH, the program proceeds to S116 in which the detected engine speed NE is compared with a predetermined value NEMFLL (e.g. 700 rpm). When it is determined that the detected engine speed NE is less than or equal to the predetermined value NEMFLL, the program proceeds to S102 for the same reason.

When it is determined in S116 that the detected engine speed NE is greater than the predetermined value NEMFLL, the program proceeds to S118 in which the detected manifold absolute pressure (engine load) PBA is compared with a predetermined value PBMFLH. When it determined that the detected manifold absolute pressure is greater than or equal to the predetermined value PBMFLH, the program proceeds to S102 for the same reason.

When it is determined in S118 that the detected manifold absolute pressure PBA is less than the predetermined value PBMFLH, the program proceeds to S120 in which the detected manifold absolute pressure PBA is compared with a predetermined value PBMFLL. When it is determined that the detected manifold absolute pressure PBA is less than or equal to the predetermined value PBMFLL, the program proceeds to S102 for the same reason.

When it is determined in S120 that the detected manifold absolute pressure PBA is greater than the predetermined value PBMFLL, the program proceeds to S122 in which the bit of the flag F.MFDR is set to 1. To set the bit of this flag to 1 indicates that it is determined that the driveability compensation control detection should be implemented.

When it is determined in S112 that the stratified combustion operation mode is selected, the program proceeds to S124 in which the detected engine speed NE is compared with a predetermined value NEMFDH (e.g. 3000 rpm). When it is determined that the detected engine speed NE is greater than or equal to the predetermined value NEMFDH, the program proceeds to S102 for the same reason.

When it is determined in S124 that the detected engine speed NE is less than the predetermined value NEMFDH, the program proceeds to S126 in which the detected engine speed NE is compared with a predetermined value NEMFDL (e.g. 700 rpm). When it is determined that the detected engine speed NE is less than or equal to the predetermined value NEMFDL, the program proceeds to S102 for the same reason.

When it is determined in S126 that the detected engine speed NE is greater than the predetermined value NEMFDL, the program proceeds to S128 in which the detected manifold absolute pressure (engine load) PBA is compared with a predetermined value PBMFDH. When it determined that the detected manifold absolute pressure is greater than or equal to the predetermined value PBMFDH, the program proceeds to S102 for the same reason.

When it is determined in S128 that the detected manifold absolute pressure PBA is less than the predetermined value PBMFDH, the program proceeds to S130 in which the detected manifold absolute pressure PBA is compared with a predetermined value PBMFDL. When it is determined that the detected manifold absolute pressure PBA is less than or equal to the predetermined value PBMFDL, the program proceeds to S102 for the same reason. When it is determined in S130 that the detected manifold absolute pressure PBA is greater than the predetermined value PBMFDL, the program proceeds to S122.

Returning to the flow chart of FIG. 3, the program proceeds to S12 in which it is determined whether the bit of the flag F.MFDR is set to 1, in other words, it is determined whether the driveability compensation control detection should be implemented.

When the result is affirmative, the program proceeds to S14 in which a delay timer (down-counter) TMMFDLY is set. The words SET.MFDLY indicates this. This processing indicates that the timer is set with one of predetermined values (each defining a delay time until the feedback control should be begun) to start counting down (time measurement).

Figure 7:
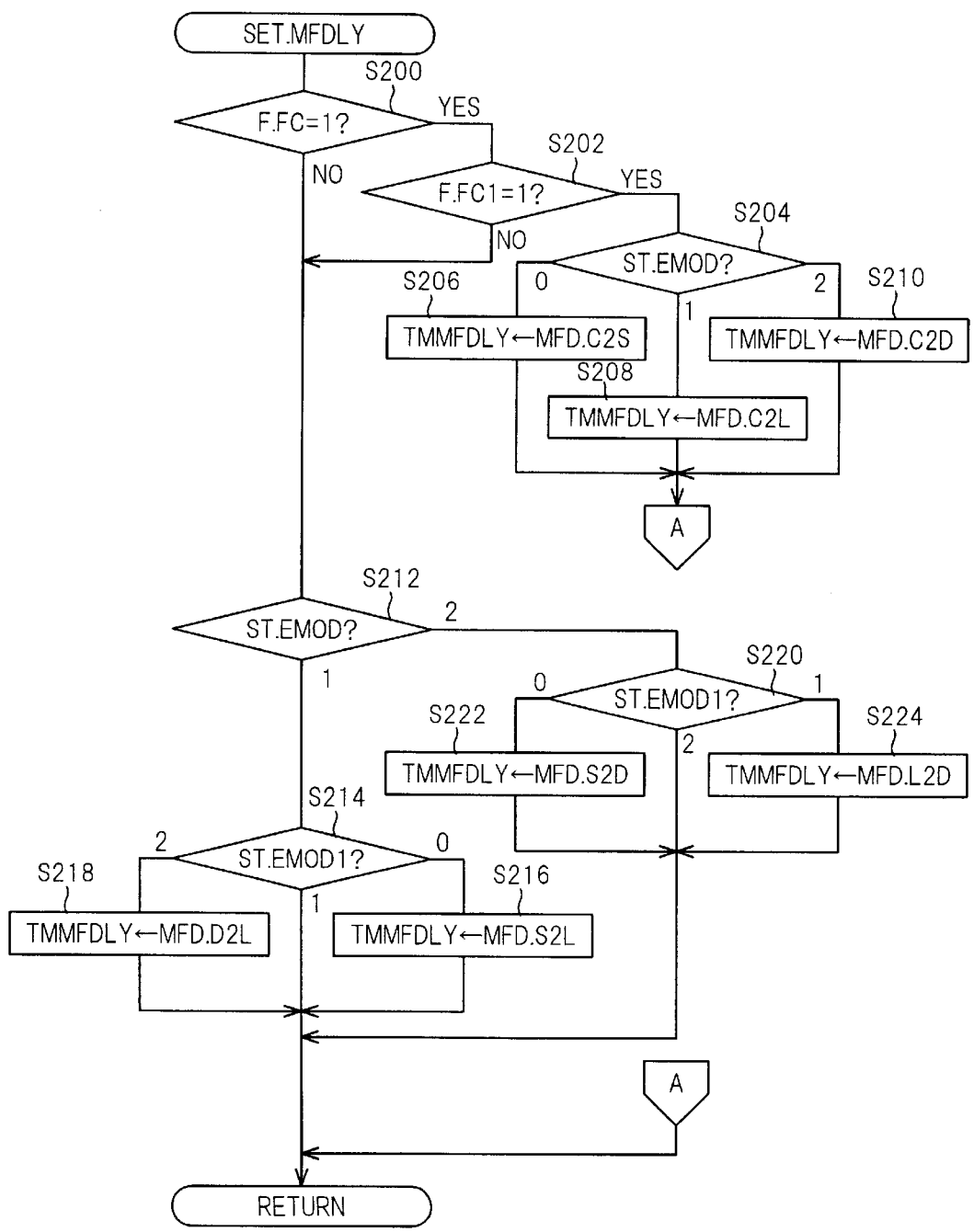
FIG. 7 is a flow chart showing the subroutine for setting of a delay timer (down-counter) TMMFDLY referred to in the flow chart of FIG. 3.

FIG. 7 is a flow chart showing the subroutine for this.

In the figure, the program begins in S200 in which it is determined whether the bit of the flag F.FC is reset to 0, i.e. it is again determined whether the fuel cutoff is in progress. When the result is affirmative, the program proceeds to S202 in which it is determined whether the bit of a flag F.FC1 is set to 1. Since this flag F.FC1 indicates the bit of the flag at the preceding cycle (the value at the last program loop of the FIG. 3 flow chart), the determination amounts for determining whether the fuel cutoff was implemented at the previous cycle.

When the result in S202 is affirmative, the program proceeds to S204 in which it is again determined which operation mode is selected. When it is determined that the stoichiometric air/fuel ratio operation mode is selected, the program proceeds to S206 in which a predetermined value MFD.C2S (e.g. 100 msec) is set on the timer TMMFDLY and the program is immediately terminated.

When it is determined in S204 that the pre-mixture combustion operation mode is selected, the program proceeds to S208 in which a predetermined value MFD.C2L (e.g. 100 msec) is set on the timer TMMFDLY. When it is determined in S204 that the stratified combustion operation mode is selected, the program proceeds to S210 in which a predetermined value MFD.C2D (e.g. 100 msec) is set on the timer TMMFDLY.

On the other hand, when the result in S200 or S202 is negative, the program proceeds to S212 in which selection of the operation mode is again determined and when it is determined that the pre-mixture combustion operation mode is selected, the program proceeds to S214 in which a value ST.EMOD1 is determined. Since this word indicates the value at the previous cycle, the determination amounts for determining whether which operation mode was selected at the previous cycle. When it is determined in S214 that the operation mode at the previous cycle was also the pre-mixture combustion operation mode, since the operation mode has not been changed, the program is immediately terminated.

When it is determined in S214 that the operation mode at the previous cycle was the stoichiometric air/fuel ratio operation mode, since this indicates that the operation mode has been changed, the program proceeds to S216 in which a predetermined value MFD.S2L (e.g. 100 msec) is set on the timer TMMFDLY. When it is determined in S214 that the operation mode at the previous cycle was the stratified combustion operation mode, since this also indicates that the operation mode has been changed, the program proceeds to S218 in which a predetermined value MFD.D2L (e.g. 100 msec) is set on the timer TMMFDLY.

When it is determined in S212 that the stratified combustion operation mode is selected, the program proceeds to S220 in which it is determined which operation mode was selected at the previous cycle. When it is determined that the same operation mode was also selected, since the operation mode has not been changed and the program is immediately terminated.

On the other hand, when it is determined in S220 that the operation mode at the previous cycle was the stoichiometric air/fuel ratio operation mode, since this indicates that the operation mode has been changed, the program proceeds to S222 in which a predetermined value MFD.S2D (e.g. 100 msec) is set on the timer TMMFDLY. When it is determined in S220 that the operation mode at the previous cycle was the pre-mixture combustion operation mode, since this also indicates that the operation mode has been changed, the program proceeds to S224 in which a predetermined value MFD.L2D (e.g. 100 msec) is set on the timer TMMFDLY.

Thus, in response to the conditions that the fuel supply is resumed after returning from the fuel cutoff or the selected operation mode is switched to the other, the delay time (during which the feedback control of the driveability compensation should delayed) is set such that the feedback control should be initiated at a time suitable for the conditions, thereby preventing erroneous detection from happening.

Returning to the flow chart of FIG. 3, the program then proceeds to S16 in which it is determined whether the feedback control of the driveability compensation should be implemented. The words JUD.MFFB indicates this.

Figure 8:
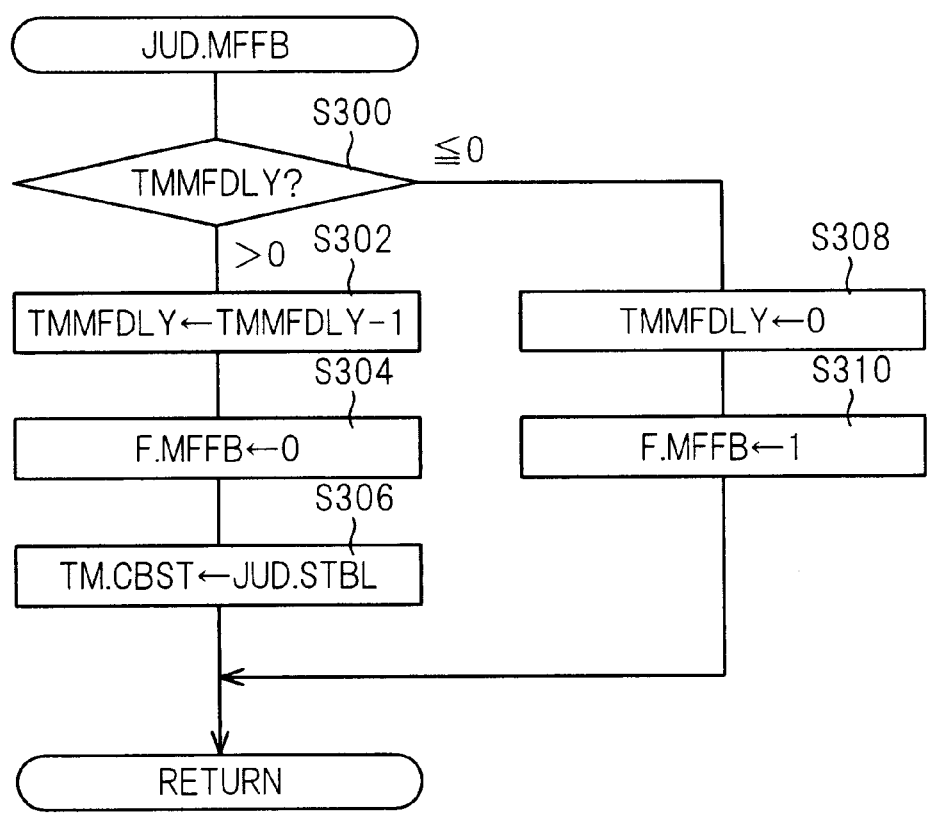
FIG. 8 is a flow chart showing the subroutine for determining whether a feedback control of the driveability compensation should be implemented, referred to in the flow chart of FIG. 3.

FIG. 8 is a flow chart showing the subroutine for this.

In the figure, the program begins in S300 in which the value of the timer TMMFDLY is determined and when it is determined that the timer value exceeds zero, the program proceeds to S302 in which the value of the timer TMMFDLY is decremented by one, to S304 in which the bit of the flag F.MFFB is reset to 0 to indicate that the feedback control should not be implemented. The program then proceeds to S306 in which the predetermined value JUD.STBL is set on the combustion stability judgement timer TM.CBST.

On the other hand, when it is determined in S300 in which the timer value is less than or equal to zero, the program proceeds to S308 in which the value of the timer TMMFDLY is reset to zero, to S310 in which the bit of the bit of the flag F.MFFB is set to 1 to indicate that the feedback control should be implemented.

Returning to the flow chart of FIG. 3, the program then proceeds to S18 in which it is determined whether the bit of the flag F.MFFB is set to 1, in other words, it is determined whether the feedback control should be implemented. When the result is affirmative, the program proceeds to S20 in which the combustion state is detected or determined. The words MON.COMB indicates this.

Figure 9:
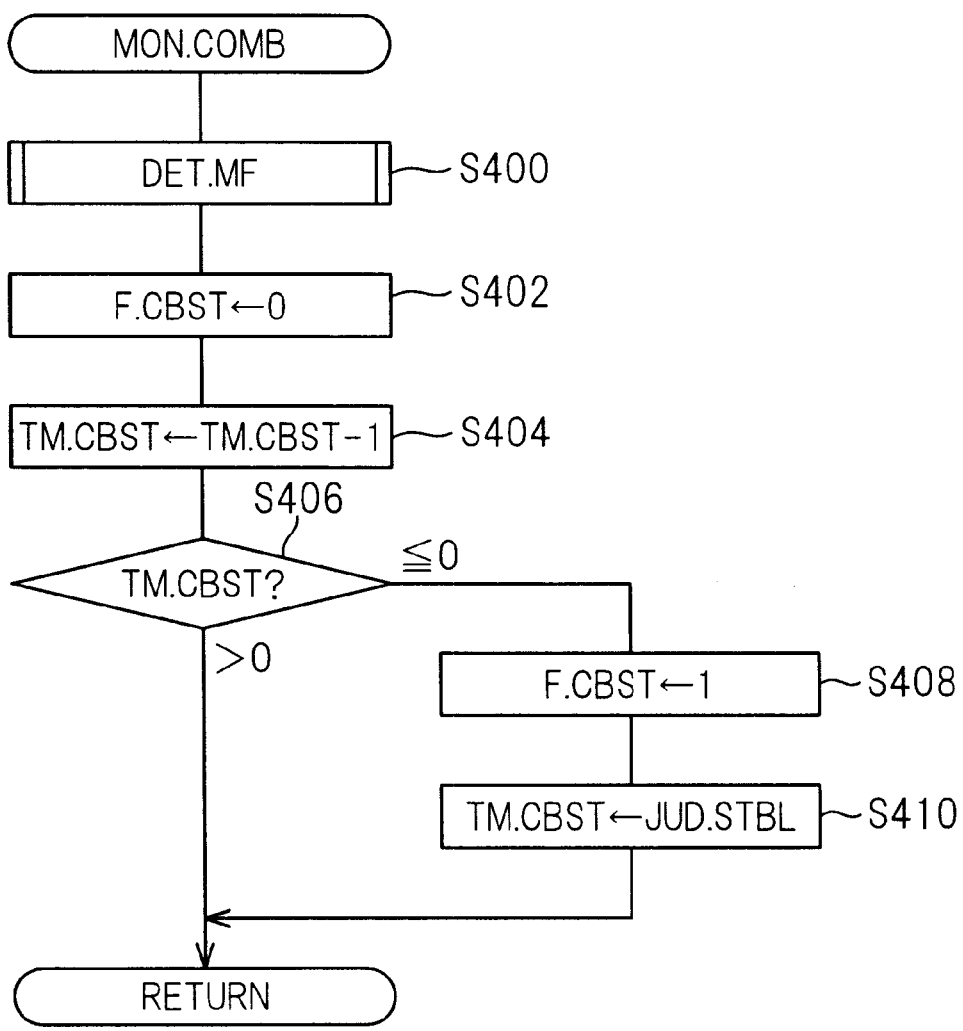
FIG. 9 is a flow chart showing the subroutine for detecting the combustion state through misfire detection referred to in the flow chart of FIG. 3.

FIG. 9 is a flow chart showing the subroutine for this.

In the figure, the program begins in S400 in which misfire detection is conducted. The word DET.MF indicates this.

Figure 10:
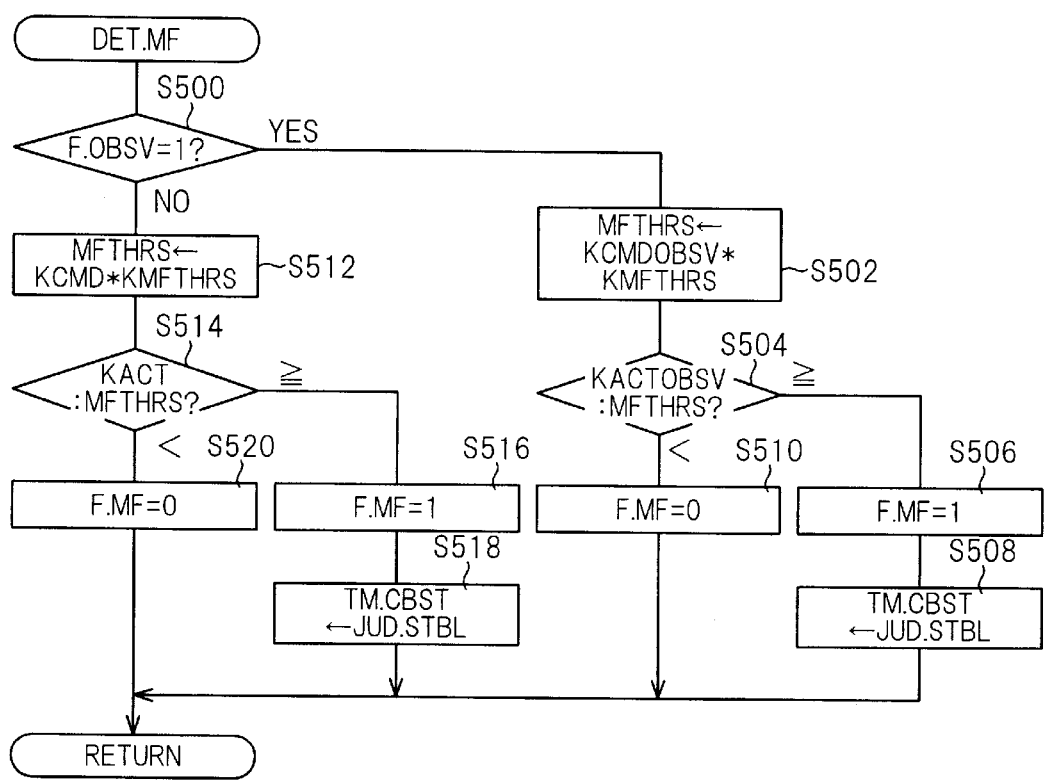
FIG. 10 is a flow chart showing the subroutine for detecting misfire referred to in the flow chart of FIG. 9.

FIG. 10 is a flow chart showing the subroutine for this.

In the figure, the program begins in S500 in which it is determined whether the bit of a flag F.OBSV is set to 1. Since the bit of the flag is set to 1 when cylinder air/fuel ratio estimation is conducted in a routine (not shown) based on the aforesaid model and observer, this determination amounts for determining whether cylinder air/fuel ratio estimation has been implemented.

Explaining the cylinder air/fuel ratio estimation from the output of a single LAF sensor, the assignee proposes, in U.S. Pat. No. 5,524,598, estimating the air/fuel ratio at each cylinder with the use of an observer. In the technique, the assignee assumes that the outputs of the LAF sensor 76 is a weight-average obtained by multiplying past firing histories of the respective cylinders by a weight coefficient C and models the same and designs an observer which, using a state equation and an output equation shown in Eq. 1, observes x(k) such that the air/fuel of each cylinder can be estimated from X(K).

$$\{X(k+1)=AX(k)+Bu(k)$$

$$\{y(k)=CX(k)+Du(k)$$

where:

$$A = \begin{pmatrix} 0 & 1 & 0 & 0 \\ 0 & 0 & 1 & 0 \\ 0 & 0 & 0 & 1 \\ 1 & 0 & 0 & 0 \end{pmatrix}, C = [c1 \quad c2 \quad c3 \quad c4] \, B = D = [0] \qquad \text{Eq. 1}$$

$$X(k) = \begin{pmatrix} x(k-3) \\ x(k-2) \\ x(k-1) \\ x(k) \end{pmatrix}$$

$$Q = \begin{pmatrix} 1 & 0 & 0 & 0 \\ 0 & 1 & 0 & 0 \\ 0 & 0 & 1 & 0 \\ 0 & 0 & 0 & 1 \end{pmatrix}, R = [1]$$

Further, the assignee proposes, in U.S. Pat. No. 5,600,056, sampling the sensor output successively and selecting one from among the sampled data by retrieving mapped data by engine operation parameters, and proposes in U.S. Pat. No. 5,548,514, selecting and using one from among a plurality of observer gain matrices from by similar engine operation parameters.

With the cylinder air/fuel ratio estimation or determination using the techniques mentioned above, it becomes possible to estimate the air/fuel ratio of each cylinder accurately and hence to conduct the misfire detection accurately and to conduct the combustion state control appropriately. If the cylinder air/fuel ratio is estimated, without this technique, from the output of a single air/fuel ratio sensor, it is not possible to estimate the air/fuel ratio at each cylinder accurately, since the sensor output merely indicates an average air/fuel ratio throughout the cylinders which is liable to affected by the event at a certain cylinder.

Since, however, the above techniques de not have the direction relationship with the invention, no further explanation will be made.

In the flow chart of FIG. 10, when the result in S500 is affirmative, the program proceeds to S502 in which a desired air/fuel ratio KCMDOBSV (indicative of the desired air/fuel ratio when the cylinder air/fuel ratio estimation is conducted) is multiplied by a predetermined value KMFTHRS and the product obtained is determined to be the threshold value MFTHRS mentioned above.

The program then proceeds to S504 in which the detected air/fuel ratio KACTOBSV (indicative of the estimated air/fuel ratio, more precisely, the estimated air/fuel ratio at a cylinder concerned when the cylinder air/fuel ratio estimation is conducted) is compared with the threshold value MFTHRS.

When it is determined in S504 that the detected air/fuel ratio KACTOBSV is greater than or equal to the threshold value MFTHRS, in other words, it is determined in this step that the detected air/fuel ratio is greater than the threshold value in the lean direction, it is determined that misfire has occurred and the program proceeds to S506 in which the bit of a flag F.MF is set to 1, to S508 in which the predetermined value JUD.STBL is set on the combustion stability judgement timer TM.CBST.

On the other hand, when it is determined in S504 that the detected air/fuel ratio KACTOBSV is less than the threshold value MFTHRS, in other words, it is determined that misfire has not occurred and the program proceeds to S510 in which the bit of the flag F.MF is reset to 0. Thus, to set the bit of the flag F.MF to 1 indicates that the misfire is detected, while to reset the bit of this flag to 0 indicates that the misfire is not detected.

When the result in S500 is negative, the program proceeds to S512 in which the desired air/fuel ratio KCMD is multiplied by the MFTHRS and the product obtained is determined to be the threshold value, to S514 in which the detected air/fuel ratio (indicative of the detected air/fuel ratio, more precisely, the average value of the air/fuel ratio throughout the four cylinders when the cylinder air/fuel ratio estimation is not implemented) is compared the threshold value MFTHRS.

When it is determined in S514 that the detected air/fuel ratio KACT is greater than or equal to the threshold value MFTHRS, in other words, it is determined in this step that the detected air/fuel ratio is greater than the threshold value in the lean direction, it is determined that misfire has occurred and the program proceeds to S516 in which the bit of the flag F.MF is set to 1, to S518 in which the predetermined value JUD.STBL is set on the combustion stability judgement timer TM.CBST. On the other hand, when it is determined in S514 that the detected air/fuel ratio KACT is less than the threshold value MFTHRS, it is determined that misfire has not occurred and the program proceeds to S520 in which the bit of the flag F.MF is reset to 0.

Returning to the explanation of the flow chart of FIG. 9, the program then proceeds to S402 in which a combustion stability judgement flag F.CBST is reset to 0 (initial value). As will be explained later, the bit of this flag is set to 1 when it is determined that the combustion is stable.

The program then proceeds to S404 in which the combustion stability judgement timer TM.CBST is decremented by one, to S406 in which the value of the timer is determined. When it is determined that the value of the timer is greater than zero, the program is immediately terminated. When it is determined that the value of the timer is less than or equal to zero, the program proceeds to S408 in which the bit of the combustion stability judgement flag F.CBST is set to 1. To be specific, since no misfire is detected during the period of time (JUD.STBL) defined by the combustion stability judgement timer TM.CBST, it is determined that the combustion is stable.

The program then proceeds to S410 in which the timer TM.CBST is set with the predetermined value JUD.STBL for a next determination.

Returning to the flow chart of FIG. 3, the program then proceeds to S22 in which learning control regions are discriminated. The word MF.AREA indicates this.

Figure 11:
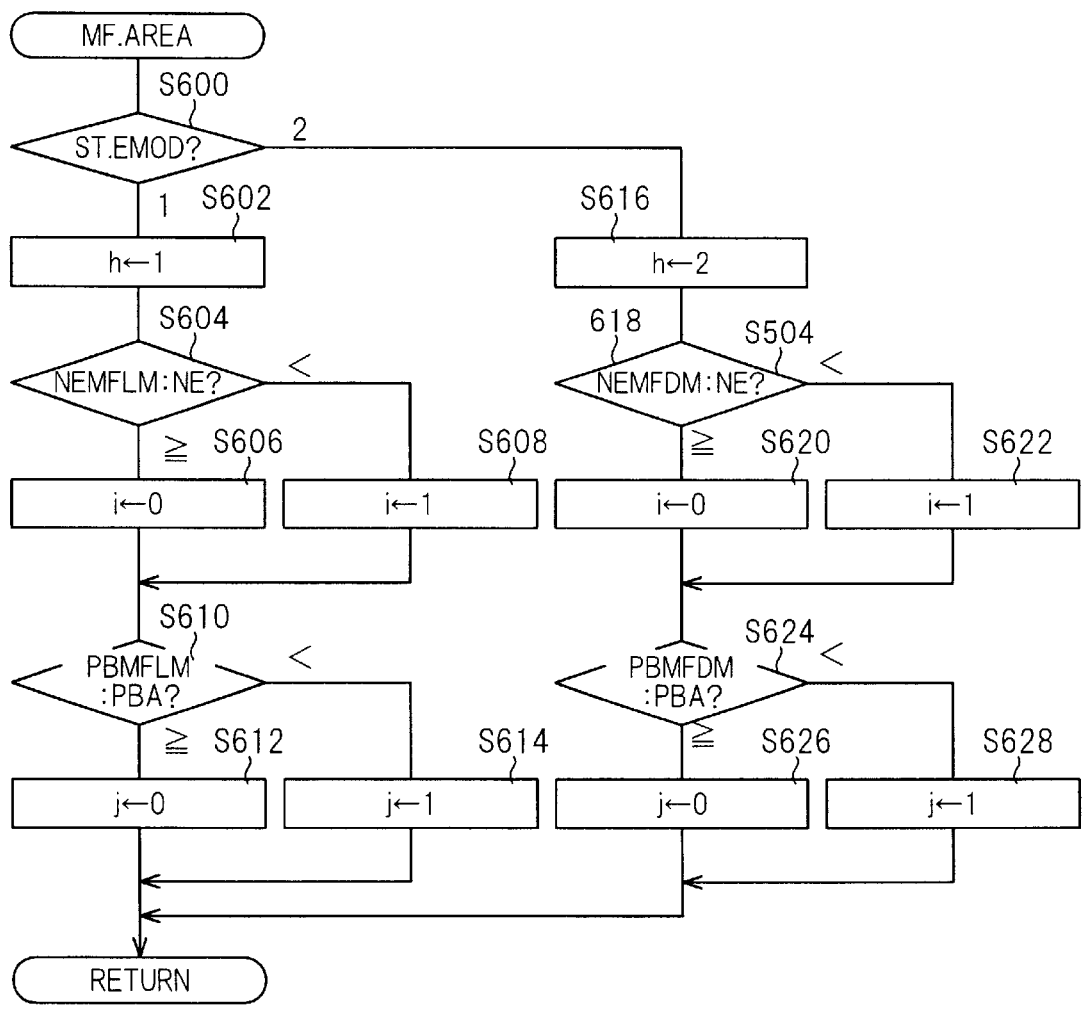
FIG. 11 is a flow chart showing the subroutine for learning control region discrimination referred to the flow chart of FIG. 3.

FIG. 11 is a flow chart showing the subroutine for this.

In the figure, the program begins in S600 in which it is determined which operation mode is selected. When it is determined that the pre-mixture operation mode is selected, the program proceeds to S602 in which a value h is determined to be 1, to S604 in which the detected engine speed NE is compared with a predetermined value NEMFLM (e.g. 2000 rpm). When the predetermined value NEMFLM is greater than or equal to the detected engine speed NE, the program proceeds to S606 in which a value i is determined to be 0. When it is determined in S604 that the predetermined value NEMFLM is less than the detected engine speed NE, the program proceeds to S608 in which the value i is determined to be 1.

The program then proceeds to S610 in which the detected manifold absolute pressure PBA (engine load) is compared with a predetermined value PBMFLM (e.g. −300 minfig). When it is determined in S610 that the predetermined value PBMFLM is greater than or equal to the detected manifold absolute pressure PBA, the program proceeds to S612 in which a value i is set to be 0. When it is determined in S610 that the predetermined value PBMFLM is less than the detected manifold absolute pressure PBA, the program proceeds to S614 in which the value is set to be 1.

When it is determined in S600 that the stratified combustion operation mode is selected, the program proceeds from S616 to S628 to determine the values h, i, j in a similar manner.

Figure 12A:
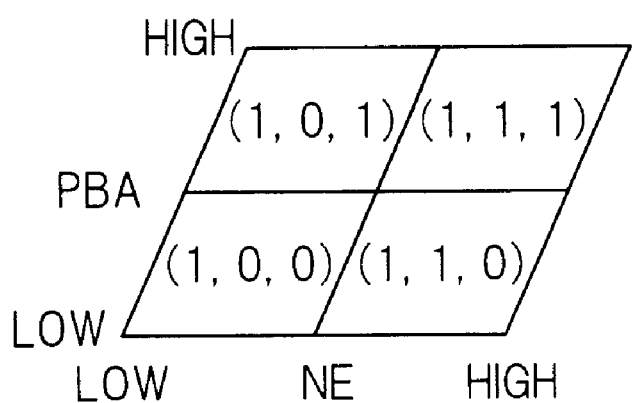
FIGS. 12A and 12B are graphs showing the discriminated learning control region referred to in the flow chart of FIG. 11.
Figure 12B:
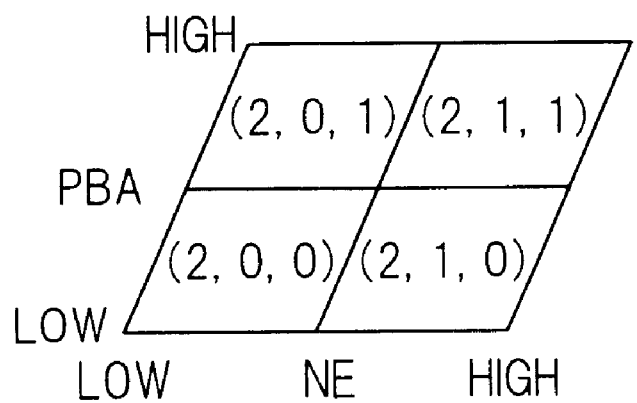

FIG. 12A shows the, thus obtained, learning control region discrimination made by the values h, i, j in the pre-mixture combustion operation mode and FIG. 12B shows that in the stratified combustion operation mode. As illustrated in the figures, the engine operating conditions are defined by the engine speed NE and the manifold absolute pressure PBA (indicative of the engine load) and the value h is used to indicate the operation mode (in the number of ST.EMOD), while the values i, j are assigned with 0 or 1 such that the learning control region are divided into four for respective lean-burn operation modes. As will be explained later, the driveability compensation degree EXT.DR is determined separately for the respective learning control regions and is stored in a back-up potion of the memory 90c after the engine 10 has been stopped. Thus, the control in this embodiment is configured to conduct a kind of learning control.

Returning to the flow chart of FIG. 3, the program then proceeds to S24 in which the driveability compensation degree EXT.DR is calculated. The word "CA L.EXTDR" indicates this.

Figure 13:
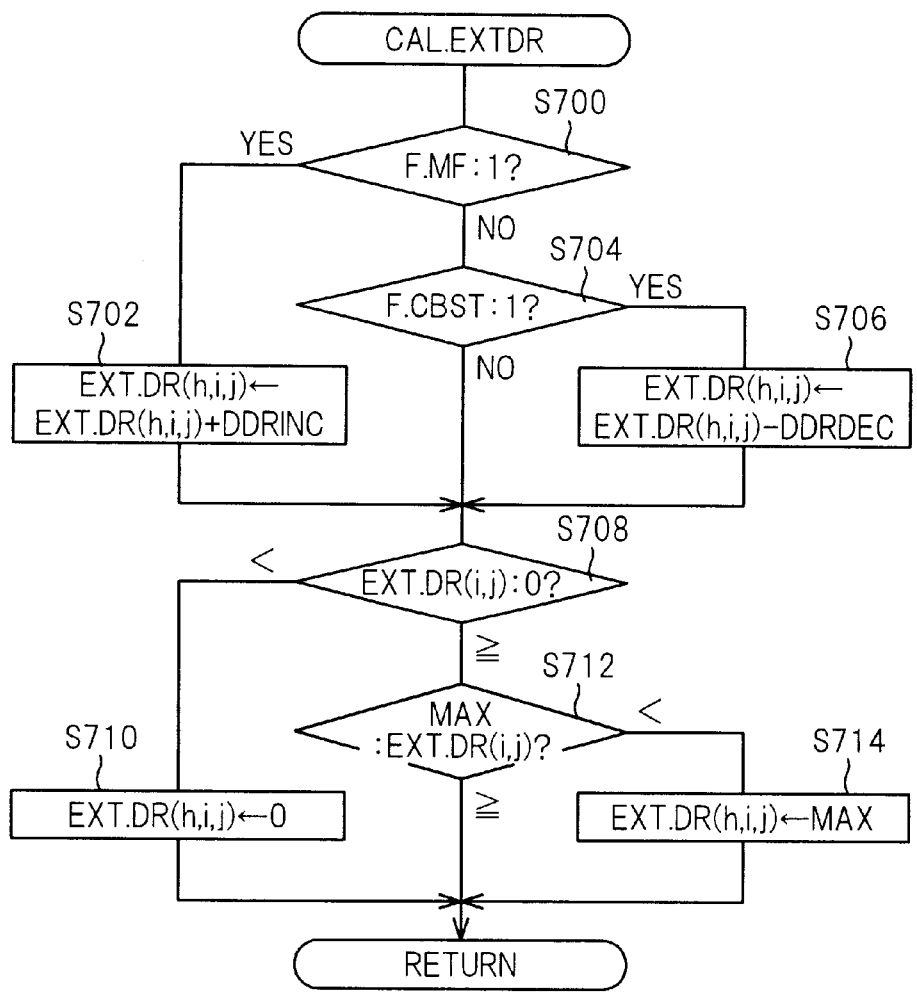
FIG. 13 is a flow chart showing the subroutine for calculating the driveability compensation degree EXT.DR referred to in the flow chart of FIG. 3.

FIG. 13 is a flow chart showing the subroutine for this.

Figure 6:
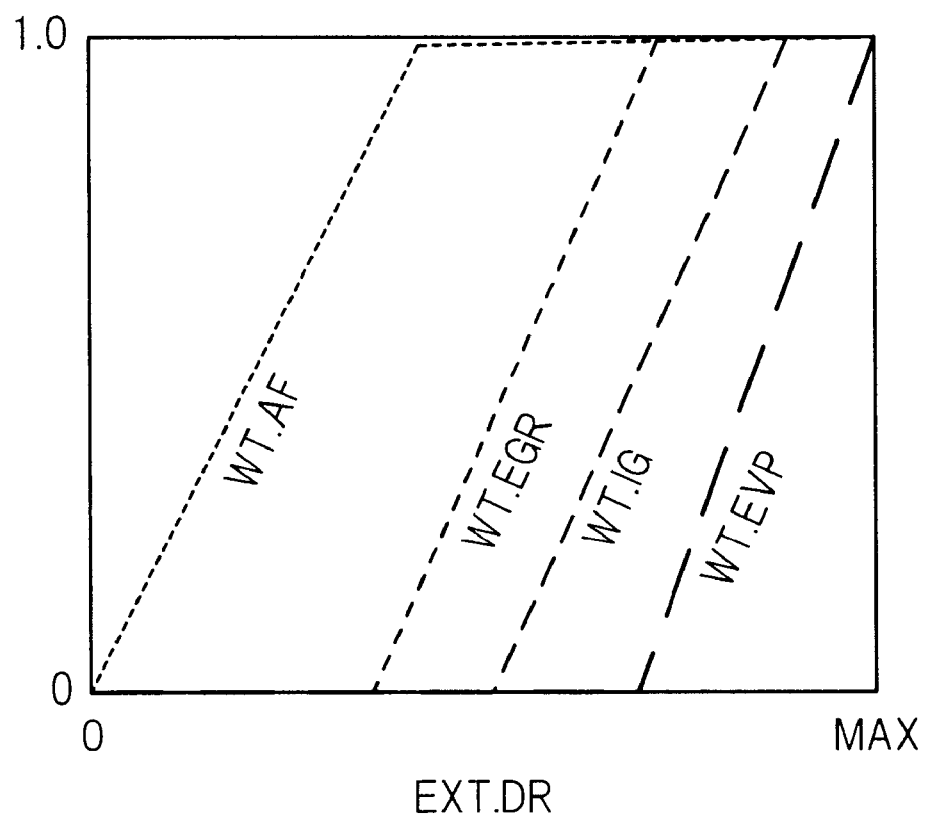
FIG. 6 is a graph showing characteristics of weight coefficients set relative to driveability compensation degree EXT.DR referred to in the flow chart of FIG. 3.

In the figure, the program begins in S700 in which it is determined whether the bit of the flag F.MF is set to 1, in other words, it is determined whether the misfire has been detected. When the result is affirmative, the program proceeds to S702 in which the driveability compensation degree EXT.DR (h,i,j) is incremented (increased) by a unit amount DDRINC. Specifically, as illustrated in FIG. 6, the value EXT.DR is changed in the direction in which the corrected values increase.

On the other hand, when the result in S700 is negative, the program proceeds to S704 in which it is determined whether the bit of the flag F.CBST is set to 1 and when the result is affirmative, the program proceeds to S706 in which the driveability compensation degree EXT.DR (h,i,j) is decremented (decreased) by a unit amount DDRDEC. Specifically, as illustrated in FIG. 6, the value EXT.DR is changed in the direction in which the corrected values decrease.

As mentioned just above, the driveability compensation degree EXT.DR is calculated separately for the respective learning control regions and is stored in a back-up potion of the memory 90c after the engine 10 has been stopped such that it begins from the stored value. When it changes in response to the change in the engine operating conditions, the value EXT.DR begins from the value before changed.

The program then proceeds to S708 in which the calculated driveability compensation degree EXT.DR (h,i,j) is compared with zero and when it is less than zero, the program proceeds to S710 in which the value is determined to be zero. When it is determined in S708 that the value is greater than or equal to zero, the program proceeds to S712 in which the value is again compared with MAX (indicative of an upper limit). When it is determined in S712 that MAX is greater than or equal to the value, the program is immediately terminated. When it is determined in S712 that MAX is less than the value, the program proceeds to S714 in which MAX is determined to be the value.

Returning to the flow chart of FIG. 3, the program then proceeds to S26 in which a correction coefficient KMFDR (general name of the correction coefficients) is calculated based on the thus-calculated driveability compensation degree EXT.DR (h,i,j). The words CAL.KMFDR indicates this.

Figure 14:
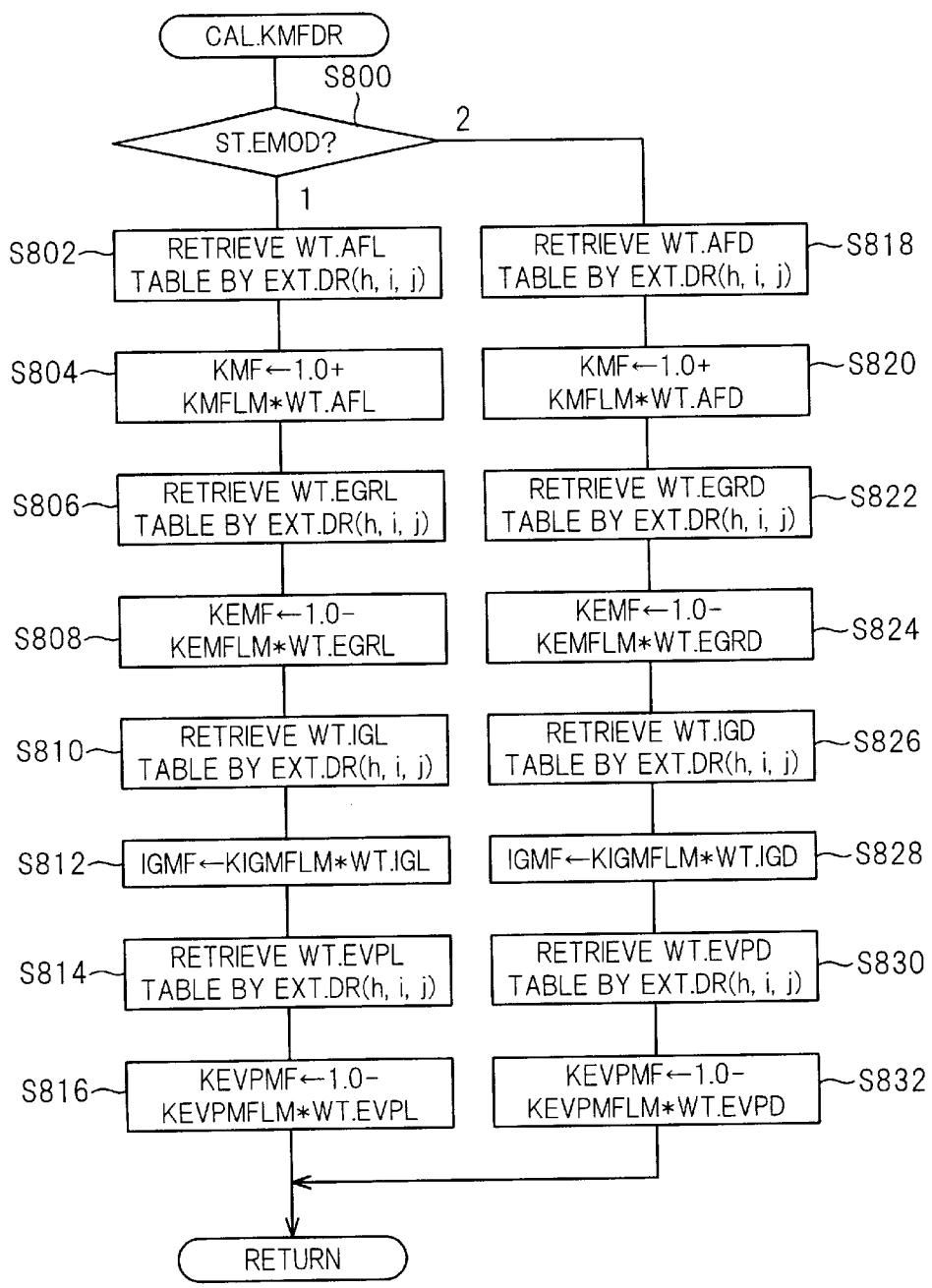
FIG. 14 is a flow chart showing the subroutine for calculating correction coefficients referred to in the flow chart of FIG. 3.

FIG. 14 is a flow chart showing the subroutine for this/

In the figure, the program begins in S800 in which it is determined which operation mode is selected and when it is determined that the pre-mixture combustion operation mode is selected, the program proceeds to S802 in which the air/fuel ratio weight coefficient WT.AFL is calculated by retrieving a WT.AFL table using the driveability compensating degree EXT.DR (h,i,j) as address data.

Figure 15A:
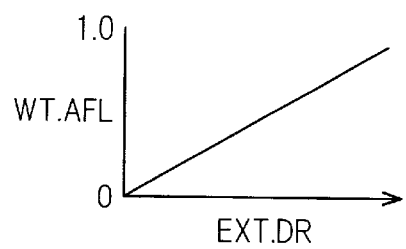
FIGS. 15A to 15D are graphs showing characteristics of coefficient tables for the pre-mixture combustion operation mode referred to in the flow chart of FIG. 14.

FIG. 15A is a graph showing a characteristic of the WT.AFL table. As illustrated, the air/fuel ratio weight coefficient WT.AFL is set to increase with increasing driveability compensating degree.

The program then proceeds to S804 in which the aforesaid air/fuel ratio correction coefficient maximum value KMFLM is multiplied by the retrieved value and 1.0 is added to the obtained product to determine a driveability compensating air/fuel ratio correction coefficient KMF is calculated. The basic value is multiplied by this value to determine the desired air/fuel ratio KCMD such that the desired air/fuel ratio KCMD is corrected in the rich direction. With this, the degradation of the combustion state can be suppressed.

The program then proceeds to S806 in which the EGR weight coefficient WT.EGRL is calculated by retrieving a WT.EGRL table using the same parameter as address data.

Figure 15B:

FIG. 15B is a graph showing a characteristic of the WT.EGRL table. As illustrated, the EGR weight coefficient WT.EGRL is set to increase with increasing driveability compensating degree.

The program then proceeds to S808 in which the aforesaid EGR correction coefficient maximum value KEMFLM is multiplied by the retrieved value and the obtained product is subtracted from 1.0 to determine a driveability compensating EGR correction coefficient KEMF (initial value 1.0).

It should be noted here that the ECU 90 determines or calculates the EGR flow rate LCMD as follows:

$$LCMD = LCMDBS \times KEMF$$

In the above, LCMDBS indicates a command value determined in terms of the lift (opening) amount of the EGR control valve 50 and is calculated as an electric command value to the electromagnetic solenoid valve associated therewith. LCMDBS is multiplied by the EGR coefficient KEMF to determine a final lift command value LCMD. Based on this, the EGR control valve 50 is opened such that the amount (flow rate) of exhaust gas proportional to the valve opening is recirculated into the air intake system. Thus, the EGR flow rate is corrected to be decreased in response to the degradation of the combustion state. With this, the degradation of the combustion state can be suppressed.

The program then proceeds to S810 in which the ignition timing weight coefficient WT.IGL is calculated by retrieving a WT.IGL table using the same parameter as address data.

Figure 15C:
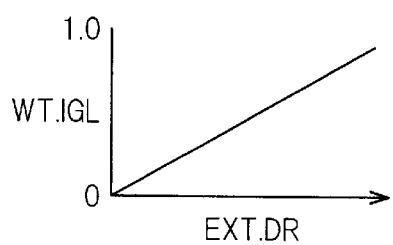

FIG. 15C is a graph showing a characteristic of the WT.IGL table. As illustrated, the ignition timing weight coefficient WT.IGL is set to increase with increasing driveability compensating degree.

The program then proceeds to S812 in which the aforesaid ignition timing correction coefficient maximum value KIGFLM is multiplied by the retrieved value to determine the driveability compensating ignition timing correction coefficient IGMF (negative value) is calculated.

Since this value is added to (more precisely, subtracted from) in the calculation of the IGCR (the sum of correction factors) to determine the output ignition timing IG, the output ignition timing is corrected in the retard direction in response to the degradation of the combustion state. With this, the degradation of the combustion state can be suppressed.

The program then proceeds to S814 in which the purge weight coefficient WT.EVPL (of the canister purging) is calculated by retrieving a WT.EVPL table using the same parameter as address data.

Figure 15D:
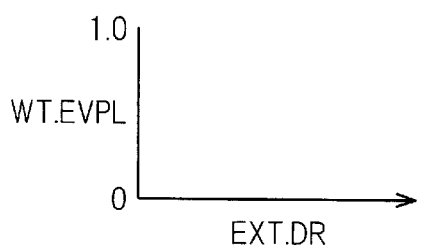

FIG. 15D is a graph showing a characteristic of the WT.EVPL table. As illustrated, the purge weight coefficient WT.EVPL is set to be zero irrespectively of the magnitude of the driveability compensating degree.

The program then proceeds to S816 in which the aforesaid purge correction coefficient maximum value KEVPMFLM is multiplied by the retrieved value and the obtained product is subtracted from 1.0 to determine a driveability compensating purge correction coefficient KEVPMF (initial value 1.0).

It should be noted here that the ECU 90 determines or calculates the purge flow ratE QPG as follows:

$$QPG = QPGBS \times KEVPMF$$

In the above, QPGBS indicates a command value determined in terms of the lift (opening) amount of the purge control valve 58 and is calculated as an electric command value to the electromagnetic solenoid valve associated therewith. QPGBS is multiplied by the purge coefficient KEVPMF to determine a final lift command value QPG is determined. Based on this, the purge control valve 58 is opened such that the flow rate (amount) of vaporized fuel proportional to the valve opening is recirculated into the air intake system. Since the purge weight coefficient WT.EVP is set to be zero as illustrated in FIG. 15D, no purge flow rate correction is conducted in the pre-mixture combustion operation mode.

When it is determined in S800 that the stratified combustion operation mode is selected, the program proceeds to S818 in which the air/fuel ratio weight coefficient WT.AFLD is calculated by retrieving a WT.AFD table using the driveability compensating degree EXT.DR (h,i,j) as address data.

Figure 16A:
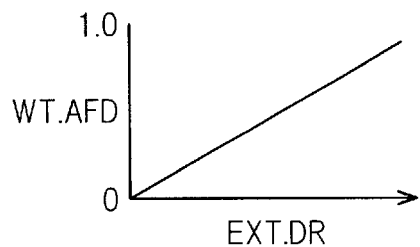
FIGS. 16A to 16D are graphs similarly showing characteristics of coefficient tables for stratified combustion operation mode referred to in the flow chart of FIG. 14.

FIG. 16A is a graph showing a characteristic of the WT.AFD table. As illustrated, the air/fuel ratio weight coefficient WT.AFD is set to increase with increasing driveability compensating degree.

The program then proceeds to S820 in which the aforesaid air/fuel ratio correction coefficient maximum value KMFLM is multiplied by the retrieved value and 1.0 is added to the obtained product to determine the driveability compensating air/fuel ratio correction coefficient KMF is calculated. With this, the desired air/fuel ratio KCMD is corrected in the rich direction in response to the degradation of the combustion state and hence, the degradation of the combustion state can be suppressed.

The program then proceeds to S822 in which the EGR weight coefficient WT.EGRD is calculated by retrieving a WT.EGRD table using the same parameter as address data.

Figure 16B:
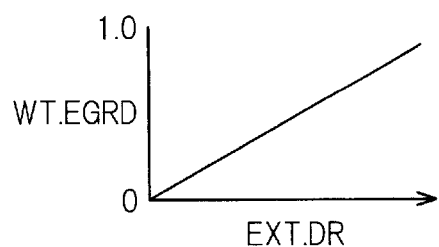

FIG. 16B is a graph showing a characteristic of the WT.EGRD table. As illustrated, the EGR weight coefficient WT.EGRD is set to increase with increasing driveability compensating degree.

The program then proceeds to S824 in which the aforesaid EGR correction coefficient maximum value KEMFLM is multiplied by the retrieved value and the obtained product is subtracted from 1.0 to determine the driveability compensating EGR correction coefficient KEMF.

The program then proceeds to S826 in which the ignition timing weight coefficient WT.IGD is calculated by retrieving a WT.IGD table using the same parameter as address data.

Figure 16C:
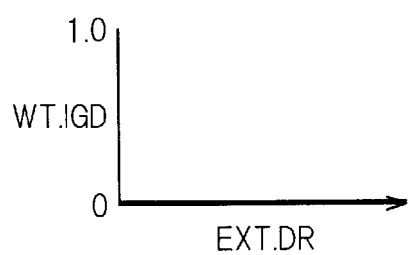

FIG. 16C is a graph showing a characteristic of the WT.IGD table. As illustrated, the ignition timing weight coefficient WT.IGD is set to be zero irrespectively of the magnitude of the driveability compensating degree.

The program then proceeds to S828 in which the aforesaid ignition timing correction coefficient maximum value KIGFLM is multiplied by the retrieved value to determine the driveability compensating ignition timing correction coefficient IGMD. Since the ignition timing weight coefficient WT.IG is set to be zero, no ignition timing correction is carried out in the stratified combustion operation mode.

The program then proceeds to S830 in which the purge weight coefficient WT.EVPD (of the canister purging) is calculated by retrieving a WT.EVPD table using the same parameter as address data.

Figure 16D:
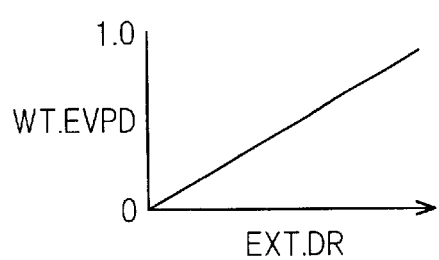

FIG. 16D is a graph showing a characteristic of the WT.EVPL table. As illustrated, the purge weight coefficient WT.EVPL is set to increase with increasing driveability compensating degree.

The program then proceeds to S832 in which the aforesaid purge correction coefficient maximum value KEVPMFLM is multiplied by the retrieved value and the obtained product is subtracted from 1.0 to determine the driveability compensating purge correction coefficient KEVPMF. With this, the desired purge flow rate is corrected in the decreasing direction in response to the degradation of the combustion state and hence, the degradation of the combustion state can be suppressed.

It should be noted here that, as will be understood from FIG. 14, no correction is made when the stoichiometric operation mode is selected.

Returning to the flow chart of FIG. 3, when the result in S12 is negative, the program proceeds to S28 in which the same procedures as those in S22 are taken, and proceeds to S26. This will be the same if the result in S18 is negative.

Specifically, when it is determined the engine operation is not within the region in which the driveability compensation control should be implemented, the system is configured to use the learning control values. This is based on the perception that, even when the engine operation is out of the region where learning control can be effectively conducted, the causes to degrade the combustion state would also exist. Therefore, the learning control values are used throughout the engine operation.

Having been configured in the foregoing manner, the system in this embodiment detects degradation of the combustion state through the occurrence of misfire and when the combustion state degradation has been detected, the factors or parameter having great influence on the restoration in the operation mode concerned are selected and changed. With this, the system can effectively suppress the degradation of the combustion state. In addition, it can accordingly make the degradation of emission performance and fuel economy to a least extent.

Further, since the misfire detection is conducted by the detected air/fuel ratio with the threshold value and the detected air/fuel ratio in each cylinder is estimated accurately based on the output of the single LAF sensor 76 with the use of the model and observer describing the behavior of the exhaust system, thereby enabling to ensure an accurate misfire detection, i.e. an accurate combustion state degradation. With this, the system can suppress the degradation of the combustion state more effectively.

Furthermore, the driveability compensating degree EXT.DR is prepared and the correction is made based on this value, the system can suppress the degradation of the combustion state more effectively.

Furthermore, since a delay time is prepared at the time of switching of the operation mode or returning from the fuel cutoff, the system can avoid an erroneous detection.

The embodiment is configured to have a system for controlling combustion state of an internal combustion engine (10) in which gasoline fuel is directly injected into cylinder combustion chambers (22), including: an air/fuel ratio sensor (76) for detecting an air/fuel ratio (KACT) of exhaust gas exhausted from the engine (10); engine operating condition detecting module (66, 70, 90) which detects operating conditions of the engine (10) including at least an engine speed (NE) and an engine load (PBA); fuel injection amount calculating module (90) which calculates a basic fuel injection amount (TIM) based on at least the engine speed (NE) and the engine load (PBA) of the detected engine operating conditions and corrects the basic fuel injection amount, such that an error between the detected air/fuel ratio (KACT) and a desired air/fuel ratio (KCMD) decreases, to determine an output fuel injection amount (TOUT) to be injected into the cylinder combustion chambers (22) of the engine (10); ignition timing calculating module (90) which calculates an ignition timing (IG) based on at least the engine speed (NE) and the engine load (PBA) of the detected engine operating conditions to ignite a mixture of the injected fuel and air drawn through an air intake system (12) and flowing into the cylinder combustion chambers (22); EGR flow rate regulating module (50, 90) which regulates an EGR flow rate (LCMD) of the exhaust gas recirculated through a pipe (48) connecting an exhaust system (42) and an air intake system (12) of the engine (10); and combustion state control module (90, S10–S28) which conducts a control to suppress degradation of combustion state, if it is determined to be degraded, by changing at least one of the desired air/fuel ratio (KCMD), the EGR flow rate (LCMD) and the ignition timing (IG) when the engine is operated in a lean-burn operation mode of a stratified combustion operation mode in which the desired air/fuel ratio is set to be a lean value. The characteristic features are that the system includes; purge flow rate regulating module (58, 90) which regulates a purge flow rate (QPG) of vaporized fuel to be purged through a pipe (56) connecting a canister (54) and the air intake system (12) of the engine (10); and operation mode selecting module (90) which selects one of the lean-burn operation modes comprising the stratified combustion operation mode and a pre-mixture combustion operation mode in which the desired air/fuel ratio is set to be a value less lean than that of the stratified combustion mode; and the combustion state control module conducts the control to suppress the degradation of combustion state, if it is determined to degraded, by changing the desired air/fuel ratio (KCMD), the EGR flow rate (LCMD) and the ignition timing (IG) when the engine is operated in the stratified combustion operation mode (S26, S800–S816), while by changing the desired air/fuel ratio (KCMD), the EGR flow rate (LCMD) and the purge flow rate (QPB) when the engine is operated in the pre-mixture combustion operation mode (S26, S800, S818–S832).

In the system, the combustion state control module includes: misfire detecting module (S20, S400, S500, S502, S504, S512, S514) which detects a misfire occurred at to the engine; and combustion state degradation determining module (S506, S516) which determines that the combustion state is degraded when the misfire is detected.

In the system, the misfire detecting module includes; threshold value calculating module (S502, S512) which calculates a threshold value (MFTHRS) based on at least the desired air/fuel ratio (KCMD; KCMDOBSV); and comparing module (S504, S514) which compares the detected air/fuel ratio (KACT, KACTOBSV) with the threshold value (MFTHRS); and detects the misfire based on a result of comparison.

The system further includes: cylinder air/fuel ratio estimating module (90) which estimates the air/fuel ratio of each cylinder (KACTOBSV) based on a model describing a behavior of an exhaust manifold and designed based on assumption that the output of the air/fuel ratio sensor comprises a weight-average obtained by multiplying past firing histories of the cylinders by a weight coefficient and an observer for observing an internal state of the model; and the comparing module compares the estimated air/fuel ratio of each cylinder (KACTOBSV) with the threshold value (MFTHRS).

In the system, the combustion state degradation determining module includes: time measuring module (S20, S410, S508, S518) which measures a period of time (TM.CBST) when the misfire is detected; parameter calculating module (S24, S700–S714) which calculates a parameter (EXT.DR) such that it is incremented when the misfire is detected during the period of time (S700–S702), while it is decremented when no misfire is detected during the period of time (S408, S704, S706); and determines the combustion state based on the parameter.

In the system, the combustion state control module includes: second time measuring module (S14, S200, S212–S214) which measures a second period of time (TMMFDLY) when the operation mode is switched between the stratified combustion mode and the pre-mixture combustion operation mode; and delays the control until the second period of time has passed (S18, S300, S304).

In the system, the combustion state control module includes: third time measuring module (S14, S200, S202–S208) which measures a second period of time (TMMFDLY) when supply of the output fuel injection is resumed after it has been cut off; and delays the control until the third period of time has passed (S18, S300, S318).

In the system, the operation mode includes a stoichiometric air/fuel ratio operation mode in which the desired air/fuel ratio is set to be a value less lean than that of the pre-mixture combustion operation mode; and the operation mode selecting module selects one of the stratified combustion operation mode, the pre-mixture operation mode and the stoichiometric air/fuel ratio operation mode based on the engine load.

It should be noted in the above that "at least" means that any other parameter(s) or value(s) may added or may instead be used.

It should further be noted that, although the invention has been described with reference to the engine whose throttle valve is driven by a stepper motor, the invention will also be applied to other type of the engine whose throttle value is driven by a similar actuator such as a torque motor and DC motor.

The entire disclosure of Japanese Patent Application No. 2000-216,014 filed on Jul. 17, 2000, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling combustion state of an internal combustion engine in which gasoline fuel is directly injected into cylinder combustion chambers, comprising:

an air/fuel ratio sensor for detecting an air/fuel ratio of exhaust gas exhausted from the engine;

engine operating condition detecting module which detects operating conditions of the engine including at least an engine speed and an engine load;

fuel injection amount calculating module which calculates a basic fuel injection amount based on at least the engine speed and the engine load of the detected engine operating conditions and corrects the basic fuel injection amount, such that an error between the detected air/fuel ratio and a desired air/fuel ratio decreases, to determine an output fuel injection amount to be injected into the cylinder combustion chambers of the engine;

ignition timing calculating module which calculates an ignition timing based on at least the engine speed and the engine load of the detected engine operating conditions to ignite a mixture of the injected fuel and air drawn through an air intake system and flowing into the cylinder combustion chambers;

EGR flow rate regulating module which regulates an EGR flow rate of the exhaust gas recirculated through a pipe connecting an exhaust system and an air intake system of the engine; and purge flow rate regulating module which regulates a purge flow rate of vaporized fuel to be purged through a pipe connecting a canister and the air intake system of the engine;

operation mode selecting module which selects one of lean-burn operation modes comprising a stratified combustion operation mode in which the desired air/fuel ratio is set to be a lean value; and a pre-mixture combustion operation mode in which the desired air/fuel ratio is set to be a value less lean than that of the stratified combustion mode; and combustion state control module which conducts a control to suppress degradation of combustion state, if it is determined to be degraded, by changing the desired air/fuel ratio, the EGR flow rate and the ignition timing when the engine is operated in the stratified combustion operation mode, while changing the desired air/fuel ratio, the EGR flow rate and the purge flow rate when the engine is operated in the pre-mixture combustion operation mode.

2. A system according to claim 1, wherein the combustion state control module includes:

misfire detecting module which detects a misfire occurred at the engine; and combustion state degradation determining module which determines that the combustion state is degraded when the misfire is detected.

3. A system according to claim 2, wherein the misfire detecting module includes;

threshold value calculating module which calculates a threshold value based on at least the desired air/fuel ratio; and comparing module which compares the detected air/fuel ratio with the threshold value;

and detects the misfire based on a result of comparison.

4. A system according to claim 3, further including:

cylinder air/fuel ratio estimating module which estimates the air/fuel ratio of each cylinder (KACTOBSV) based on a model describing a behavior of an exhaust manifold and designed based on assumption that the output of the air/fuel ratio sensor comprises a weight-average obtained by multiplying past firing histories of the cylinders by a weight coefficient and an observer for observing an internal state of the model;

and the comparing module compares the estimated air/fuel ratio of each cylinder with the threshold value.

5. A system according to 2, wherein the combustion state degradation determining module includes:

time measuring module which measures a period of time when the misfire is detected;

parameter calculating module which calculates a parameter such that it is incremented when the misfire is detected during the period of time, while it is decremented when no misfire is detected during the period of time;

and determines the combustion state based on the parameter.

6. A system according to claim 1, wherein the combustion state control module includes:

second time measuring module which measures a second period of time when the operation mode is switched between the stratified combustion mode and the pre-mixture combustion operation mode;

and delays the control until the second period of time has passed.

7. A system according to claim 1, wherein the combustion state control module includes:

third time measuring module which measures a second period of time when supply of the output fuel injection is resumed after it has been cut off;

and delays the control until the third period of time has passed.

8. A system according to claim 1, wherein the operation mode includes a stoichiometric air/fuel ratio operation mode in which the desired air/fuel ratio is set to be a value less lean than that of the pre-mixture combustion operation mode;

and the operation mode selecting module selects one of the stratified combustion operation mode, the pre-mixture operation mode and the stoichiometric air/fuel ratio operation mode based on the engine load.

9. A method of controlling combustion state of an internal combustion engine in which gasoline fuel is directly injected into cylinder combustion chambers, comprising the steps of:

(a) a detecting an air/fuel ratio of exhaust gas exhausted from the engine;

(b) detecting operating conditions of the engine including at least an engine speed and an engine load;

(c) calculating a basic fuel injection amount based on at least the engine speed and the engine load of the detected engine operating conditions and for correcting the basic fuel injection amount, such that an error between the detected air/fuel ratio and a desired air/fuel ratio decreases, to determine an output fuel injection amount to be injected into the cylinder combustion chambers of the engine;

(d) calculating an ignition timing based on at least the engine speed and the engine load of the detected engine operating conditions to ignite a mixture of the injected fuel and air drawn through an air intake system and flowing into the cylinder combustion chambers;

(e) regulating an EGR flow rate of the exhaust gas recirculated through a pipe connecting an exhaust system and an air intake system of the engine; and (f) regulating a purge flow rate of vaporized fuel to be purged through a pipe connecting a canister and the air intake system of the engine;

(g) selecting one of lean-burn operation modes comprising a stratified combustion operation mode in which the desired air/fuel ratio is set to be a lean value; and a pre-mixture combustion operation mode in which the desired air/fuel ratio is set to be a value less lean than that of the stratified combustion mode; and (h) conducting a control to suppress degradation of combustion state, if it is determined to be degraded, by changing the desired air/fuel ratio, the EGR flow rate and the ignition timing when the engine is operated in the stratified combustion operation mode, while changing the desired air/fuel ratio, the EGR flow rate and the purge flow rate when the engine is operated in the pre-mixture combustion operation mode.

10. A method according to claim 9, wherein the step (h) includes the steps of:

(i) detecting a misfire occurred at the engine; and (j) determining that the combustion state is degraded when the misfire is detected.

11. A method according to claim 10, wherein the step (i) includes the steps of, (k) calculating a threshold value based on at least the desired air/fuel ratio; and (l) comparing the detected air/fuel ratio with the threshold value; and detects the misfire based on a result of comparison.

12. A method according to claim 11, further including the step of:

(m) estimating the air/fuel ratio of each cylinder (KACTOBSV) based on a model describing a behavior of an exhaust manifold and designed based on assumption that the detected air/fuel ratio comprises a weight-average obtained by multiplying past firing histories of the cylinders by a weight coefficient and an observer for observing an internal state of the model;

and the step (l) compares the estimated air/fuel ratio of each cylinder with the threshold value.

13. A method according to 10, wherein the step (j) includes the steps of:

(n) measuring a period of time when the misfire is detected;

(o) calculating a parameter such that it is incremented when the misfire is detected during the period of time, while it is decremented when no misfire is detected during the period of time;

and determines the combustion state based on the parameter.

14. A method according to claim 9, wherein the step (h) includes the step of:

(p) measuring a second period of time when the operation mode is switched between the stratified combustion mode and the pre-mixture combustion operation mode;

and delays the control until the second period of time has passed.

15. A method according to claim 9, wherein the step (h) includes the step of:

(q) measuring a second period of time when supply of the output fuel injection is resumed after it has been cut off;

and delays the control until the third period of time has passed.

16. A method according to claim 9, wherein the operation mode includes a stoichiometric air/fuel ratio operation mode in which the desired air/fuel ratio is set to be a value less lean than that of the pre-mixture combustion operation mode;

and the step (g) selects one of the stratified combustion operation mode, the pre-mixture operation mode and the stoichiometric air/fuel ratio operation mode based on the engine load.

* * * * *

UNITED STATES PATENT AND TRADEMARK OFFICE
CERTIFICATE OF CORRECTION

PATENT NO. : 6,516,772 B2 Page 1 of 1
DATED : February 11, 2003
INVENTOR(S) : Masaki Ueno et al.

It is certified that error appears in the above-identified patent and that said Letters Patent is hereby corrected as shown below:

Column 22,
Line 35, delete "according to 2" and substitute therefor -- according to claim 2 --.

Column 24,
Line 18, delete "according to 10", and substitute therefor -- according to claim 10 --.

Signed and Sealed this

Eighteenth Day of May, 2004

JON W. DUDAS
*Acting Director of the United States Patent and Trademark Office*